United States Patent
Radhakrishnan et al.

(10) Patent No.: US 12,451,212 B2
(45) Date of Patent: Oct. 21, 2025

(54) DEVICE, SYSTEM AND METHOD FOR MEMORY REPAIR WITH MULTI-CELL SWITCHING

(71) Applicant: SK Hynix NAND Product Solutions Corp., Rancho Cordova, CA (US)

(72) Inventors: Aravinda Radhakrishnan, Sunnyvale, CA (US); Marcus Wing-Kin Cheung, Cupertino, CA (US); Dinesh Somasekhar, Portland, OR (US); Naga Mallika Bhandaru, Fremont, CA (US); Michael Nelms, Fort Collins, CO (US); Rodrigo Gonzalez Gutierrez, Hillsboro, OR (US); Kaitlyn Chen, Hillsboro, OR (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 960 days.

(21) Appl. No.: 16/912,498

(22) Filed: Jun. 25, 2020

(65) Prior Publication Data
US 2021/0407618 A1 Dec. 30, 2021

(51) Int. Cl.
*G11C 29/00* (2006.01)
*G11C 5/14* (2006.01)

(52) U.S. Cl.
CPC .......... *G11C 29/702* (2013.01); *G11C 5/147* (2013.01)

(58) Field of Classification Search
CPC ....... G11C 29/702; G11C 5/147; G11C 29/76; G11C 29/4401; G11C 29/44; G11C 29/808; G11C 29/787
See application file for complete search history.

(56) References Cited

U.S. PATENT DOCUMENTS

| | | | | |
|---|---|---|---|---|
| 5,204,836 A | * | 4/1993 | Reed | G11C 29/804 714/6.32 |
| 5,448,572 A | * | 9/1995 | Knox | H04J 3/14 714/4.2 |
| 2002/0118581 A1 | * | 8/2002 | Pitts | G11C 29/848 365/200 |
| 2002/0154553 A1 | * | 10/2002 | Shubat | G11C 29/802 365/189.12 |
| 2018/0075929 A1 | * | 3/2018 | Kim | G11C 29/76 |

OTHER PUBLICATIONS

Shuster, "Multi Word/Bit Line Redundancy for Semiconductor Memories", IEEE Journal of Solid-State Circuits, vol. 13, No. 5, pp. 698-703, Oct. 1978, doi: 10.1109/JSSC.1978.1051122. (6 pages).

* cited by examiner

*Primary Examiner* — Uyen Smet
(74) *Attorney, Agent, or Firm* — Haley Guiliano LLP

(57) ABSTRACT

Techniques and mechanisms for a memory device to support memory repair functionality for a column of a memory array. In an embodiment, the column comprises first memory cells and second memory cells, where switch circuitry is coupled between multiple signal lines and the column. Control circuitry transitions the switch circuitry to a state which corresponds to a defective one of the first cells. The state switchedly decouples the defective cell, and an adjoining one of the first cells, each from respective ones of the signal lines. During the state, two or more of the signal lines are able to communicate each to a different respective one of the second cells. In another embodiment, the switch circuitry is transitioned to the state based on an identifier of the defective cell, and independent of whether any other cell of the column has been identified as defective.

12 Claims, 9 Drawing Sheets

DEVICE, SYSTEM AND METHOD FOR MEMORY REPAIR WITH MULTI-CELL SWITCHING

BACKGROUND

1. Technical Field

This disclosure generally relates to memory systems and more particularly, but not exclusively, to the operation of a memory device which has multiple defective memory cells.

2. Background Art

Memory repair techniques variously make a spare memory cell available for use as an alternative for another memory cell which has been identified as defective. Row-based memory repair techniques variously add a spare row of memory cells to a memory array. The spare row is allocated as an alternative to a row that has been identified as defective—e.g., where addressing circuitry and/or other resources are configured to accommodate the substituted use of the spare row.

In column-based memory repair techniques, columns of a given memory array are each provided with a respective spare memory cell. Currently, the determination that any one spare memory cell of a column is to be used in data read/write operations (as an alternative to a defective cell) is made on a cell-specific basis—e.g., based on the identification of the one defective memory cell of the column, and independent of whether some other spare memory cell of the column is to be used as an alternative for any other defective memory cell of the column.

With continued improvement in the fabrication of denser memory technologies, random bit failures in memory arrays are becoming an increasingly common phenomenon. Quality control in semiconductor processing often relies on a yield-to-$V_{CCMIN}$ target which allows for a certain quantity of unrepaired memory. In many cases, the scaling of this quantity depends on the manufacturing timeframe for a given product. Total unrepaired memory on a particular memory device is usually limited to this budget to avoid a steep die cost impact. As successive generations of memory technologies continue to scale in size, there is expected to be an increasing demand for solutions to improve the effective yield of integrated circuit fabrication.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1A:
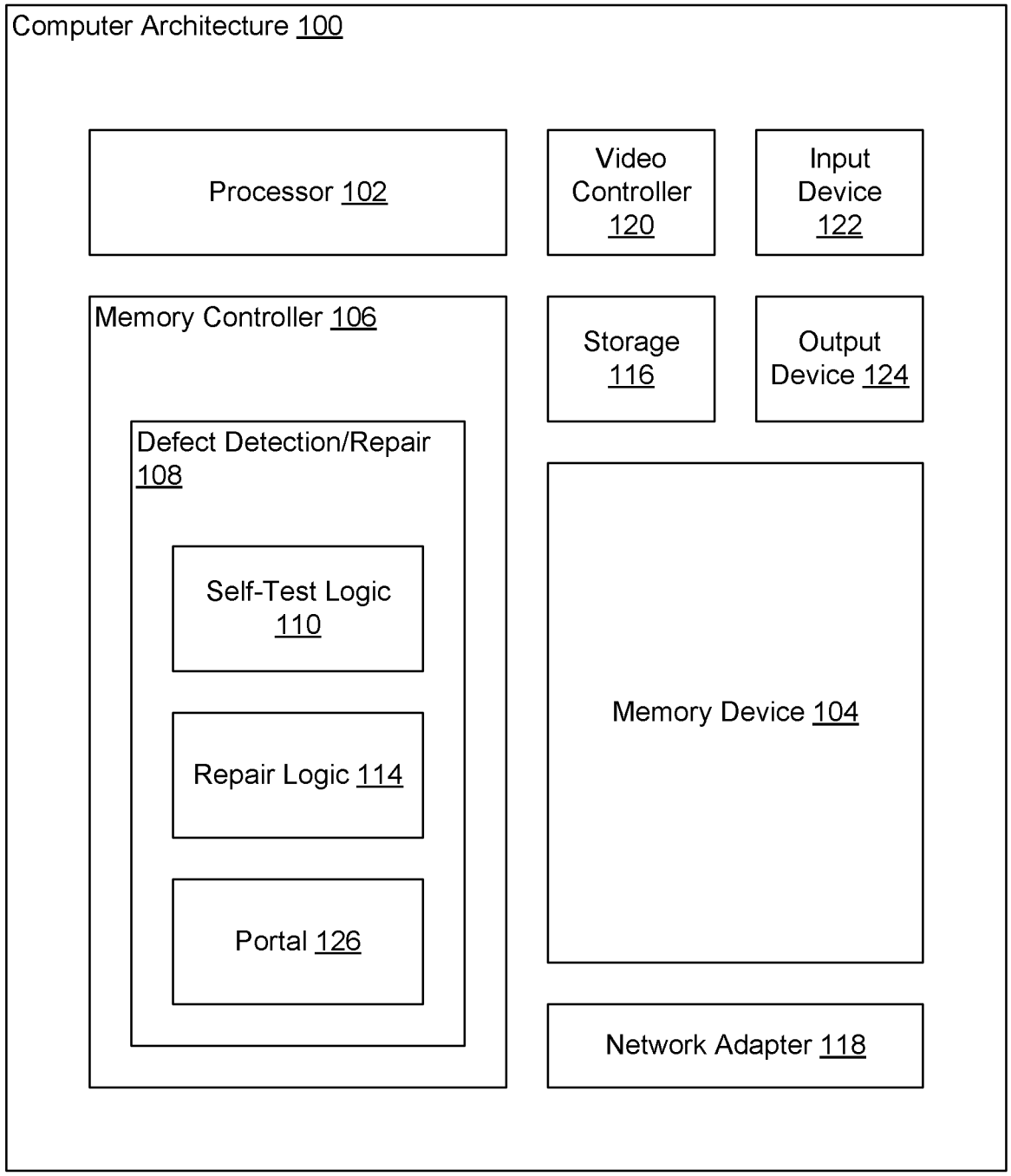
FIGS. 1A, 1B illustrate functional block diagrams each showing features of a respective computer architecture device to provide memory repair functionality according to a corresponding embodiment.

Embodiments discussed herein variously provide techniques and mechanisms for a resource efficient memory repair functionality which accommodates two defective memory cells being adjacent to each other in a column of a memory array. By providing column-wise memory repair functionality at a multi-cell level of granularity (e.g., where the multiple cells are adjacent to one another), some embodiments variously provide for relatively simple circuit designs, as compared to those used in conventional column-based memory repair. These relatively simple circuit designs contribute to increased effective yields in the fabrication of integrated circuit (IC) chips.

In an illustrative scenario according to various embodiments, a memory array comprises memory cells arranged in rows and columns, where one such column comprises some (x+1) memory cells $c(0), \ldots, c(x)$, as well as some (y+1) spare memory cells $r(0), \ldots, r(y)$ (where x is a positive integer, and where y is a positive integer less than x). Writes to the column, or reads from the column, are to be facilitated with the communication of data signals each by a different respective one of (x+1) signal lines $d(0), \ldots, d(x)$. The spare memory cells $r(0), \ldots, r(y)$ are available to be used each as an alternative for a different respective defective one of memory cells $c(0), \ldots, c(x)$. For example, switch circuitry, coupled between memory cells $c(0), \ldots, c(x)$ and the signal lines $d(0), \ldots, d(x)$, is operable to determine a particular correspondence of signal lines $d(0), \ldots, d(x)$ each to a different respective one of memory cells $c(0), \ldots, c(x)$.

In an instance where each of memory cells $c(0), \ldots, c(x)$ is determined to be operational (non-defective), control circuitry transitions the switch circuitry to a state which switchedly couples memory cells $c(0), \ldots, c(x)$ to signal lines $d(0), \ldots, d(x)$, respectively.

By contrast, where it is instead determined that a particular memory cell c(m) of memory cells $c(0), \ldots, c(x)$ is defective (where the index m is a non-negative integer less than x), the control circuitry transitions the switch circuitry to an alternative state which corresponds to the cell c(m). This alternative state prevents the use of multiple memory cells in data reads or data writes—e.g., where the multiple memory cells are contiguous with each other in the column, and comprise the defective cell c(m).

By way of illustration and not limitation, the state of the switch circuitry switchedly decouples (y+1) memory cells—e.g., in this example, cells $c(m), \ldots, c(m+y)$—to prevent communication between said memory cells and signal lines $d(0), \ldots, d(x)$. Furthermore, the state of the switch circuitry switchedly couples the (x−m−y) memory cells $c(m+y+1), \ldots, c(x)$ to signal lines $d(m), \ldots, d(x-y-1)$, respectively. During the state of the switch circuitry, the (y+1) spare memory cells $r(0), \ldots, r(y)$ are coupled to communicate with signal lines $d(x-y), \ldots, d(x)$, respectively. In those instances where m is greater than zero, for each memory cell c(i)—where the non-negative index i is less than m—the selected state of the switch circuitry switchedly couples that memory cell c(i) to signal line d(i). Accordingly, some embodiments variously provide switch circuitry which is operable to support any of various states to selectively shift a correspondence of multiple memory cells each to a different respective signal line with which data is to be written to (or read from) the column.

Some embodiments variously provide, or are otherwise based on, operation of switch circuitry (e.g., including multiplexer circuitry) to perform multi-cell switching. As used herein, "multi-cell switching" refers to one or more operations which switchedly couple multiple cells each with a respective signal line and/or which switchedly decouple multiple cells each from a respective signal line—e.g., where each such coupling or decoupling is based on an indication that one memory cell is defective.

In this context, "switchedly couple" and related terms variously refer herein to the providing of a conductive path between two circuit structures by via circuitry which provides multiplexer, demultiplexer or such switch functionality (where the conductive path is enabled at least in part by an operational state of circuitry). Similarly, "switchedly decouple" and related terms variously refer herein to the preventing of a conductive path between two circuit structures by via such switch functionality (where the conductive path is prevented by an alternative state of circuitry).

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, Internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a memory array and memory repair circuitry coupled thereto.

FIG. 1 illustrates one embodiment of a computer architecture device 100 to provide memory defect detection and repair in accordance with an embodiment. Computer architecture device 100 comprises any of various computing devices known in the art, such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g., system on a chip, processor, bridge, memory controller, memory, etc.). In the example embodiment shown, computer architecture device 100 comprises a processor 102 (e.g., a microprocessor), a memory device 104 (e.g., a volatile or nonvolatile memory device), and a memory controller 106 which controls input and output operations to and from memory device 104.

As explained in greater detail herein, memory controller 106 includes an internal defect detection and repair circuit 108 which includes a self-test logic circuit 110 within computer architecture device 100 and a repair logic circuit 114 also within computer architecture device 100. In an alternative embodiment, some or all of the functionality of defect detection and repair circuit 108 is external to memory controller 106—e.g., wherein defect detection and repair circuit 108 is external to computer architecture device 100 and facilitates a repair of memory device 104 prior to its inclusion in computer architecture device 100. In some embodiments, defect detection and repair circuit 108 performs one or more operations which (for example) are adapted from conventional techniques to detect and identify defective memory cells of a memory array. Such conventional detection techniques are not limiting on some embodiments, and are not detailed herein to avoid obscuring certain features of said embodiments.

Self-test logic circuit 110 is configured to automatically identify defective memory cells in memory device 104. Upon identifying one or more defective memory cells, repair logic circuit 114 is configured to automatically facilitate a repair the defective memory cells by replacing the use of defective cells with the use of spare cells within memory device 104. In one such embodiment, memory device 104 is on an IC die that (for example) is included in the same package as a logic die having self-test logic circuit 110 and repair logic circuit 114. Alternatively, such a memory die could be outside the package of the logic die, on top of the logic die, adjacent to the logic die or on a plug in module such as a dual in line memory module (DIMM).

As used herein, the term "automated" includes fully automated in which once stress testing of the device is initiated, the test and repair operations of the device proceed through repair of at least one memory location without any user intervention. Also, the term "automated" includes substantially automated in which once stress testing of the device is initiated, the test and repair operations of the device proceed through repair of at least one memory location with limited user intervention. However, most of the test and repair operations proceed without any user intervention. In some embodiments, at least 50%, at least 75% or at least 95% of the test and repair operations proceed without any user intervention.

In the illustrated embodiment, memory controller 106 is disposed on a semiconductor die within computer architecture device 100 and self-test logic circuit 110 and repair logic circuit 114 of defect detection and repair circuit 108 are disposed on the same die of memory controller 106. Thus, although self-test logic circuit 110 and repair logic circuit 114 are depicted as built in to memory controller 106, it is appreciated that self-test logic circuit 110 and repair logic circuit 114 are built into other circuits of computer architecture device 100, in various other embodiments.

In some embodiments, self-test logic circuit 110 is capable of generating a wide range of test patterns for testing memory device 104. Moreover, in some embodiments, the test patterns generated by self-test logic circuit 110 are readily modified as conditions warrant. In one such embodiment, the generated pattern of data is selected to be a function of the pattern of memory cell addresses of the memory cells in which the generated pattern of data is to be written. The variety of data patterns are readily generated, for example, as a function of memory addresses including inverting data in a striped pattern, or a checkerboard pattern, or other pattern, for example, depending upon the selected memory address-based function.

In some embodiments wherein defect detection and repair circuit 108 is located on the same die as the memory cells, the defect detection and repair circuit 108 is activated to test for, and facilitate a repair of, memory defects during the manufacture process at the wafer or die level, and (for example) also after semiconductor components have been assembled and packaged. In some embodiments wherein the defect detection and repair circuit 108 is located on a separate die such as a logic device, the defect detection and repair circuit 108 is used to test a memory device or devices after the memory has been connected to a device containing the defect detection and repair circuit 108. Further, it is appreciated that in some embodiments, defect detection and repair circuit 108 is activated to test for, and facilitate a repair of, memory defects should a memory failure occur after computer architecture device 100 has been packaged in a housing and sold to consumers. Thus, defect detection and repair circuit 108 interrupts normal memory transactions between processor 102 and memory 104 to conduct memory test and repair operations.

Computer architecture device 100 further includes storage 116 (e.g., a non-volatile storage, such as magnetic disk drives, optical disk drives, a tape drive, flash memory, etc.). Storage 116 comprises an internal storage device or an attached or network accessible storage. Programs in storage 116 are loaded into memory device 104 and executed by processor 102 in a manner known in the art. Computer architecture device 100 further includes a network controller or adapter 118 to enable communication with a network, such as an Ethernet, a Fiber Channel Arbitrated Loop, etc. Further, computer architecture device 100, in certain embodiments, includes a video controller 120 to render information on a display monitor, where video controller 120 is embodied on a video card or integrated on integrated circuit components mounted on a motherboard or other substrate. An input device 122 is used to provide user input to processor 102, and may include a keyboard, mouse, pen-stylus, microphone, touch sensitive display screen, input pins, sockets, or any other activation or input mechanism known in the art. An output device 124 is capable of rendering information transmitted from processor 102, or other component, such as a display monitor, printer, storage, output pins, sockets, etc. Network adapter 118 may embodied on a network card, such as a Peripheral Component Interconnect (PCI) card, PCI-express, or some other I/OF card, or on integrated circuit components mounted on a motherboard or other substrate.

Defect detection and repair circuit 108 includes a portal 126 through which test and repair input and output information are passed among defect detection and repair circuit 108 and the other components of computer architecture device 100 and if appropriate, to devices external to computer architecture device 100 via input device 122 and output device 124. One example of the portal 126 is an on-chip communication network or fabric side band. In one embodiment, portal 126 is accessed externally through a Test Access Port (TAP) system. Other communication portals are utilized, depending upon the particular application.

One or more of the components of computer architecture device 100 are omitted, depending upon the particular application. For example, a network router may lack video controller 120, for example. Also, any one or more of the components of the computer architecture device 100 may include one or more integrated circuits having an on-die defect detection and repair circuit as described herein.

Figure 1B:
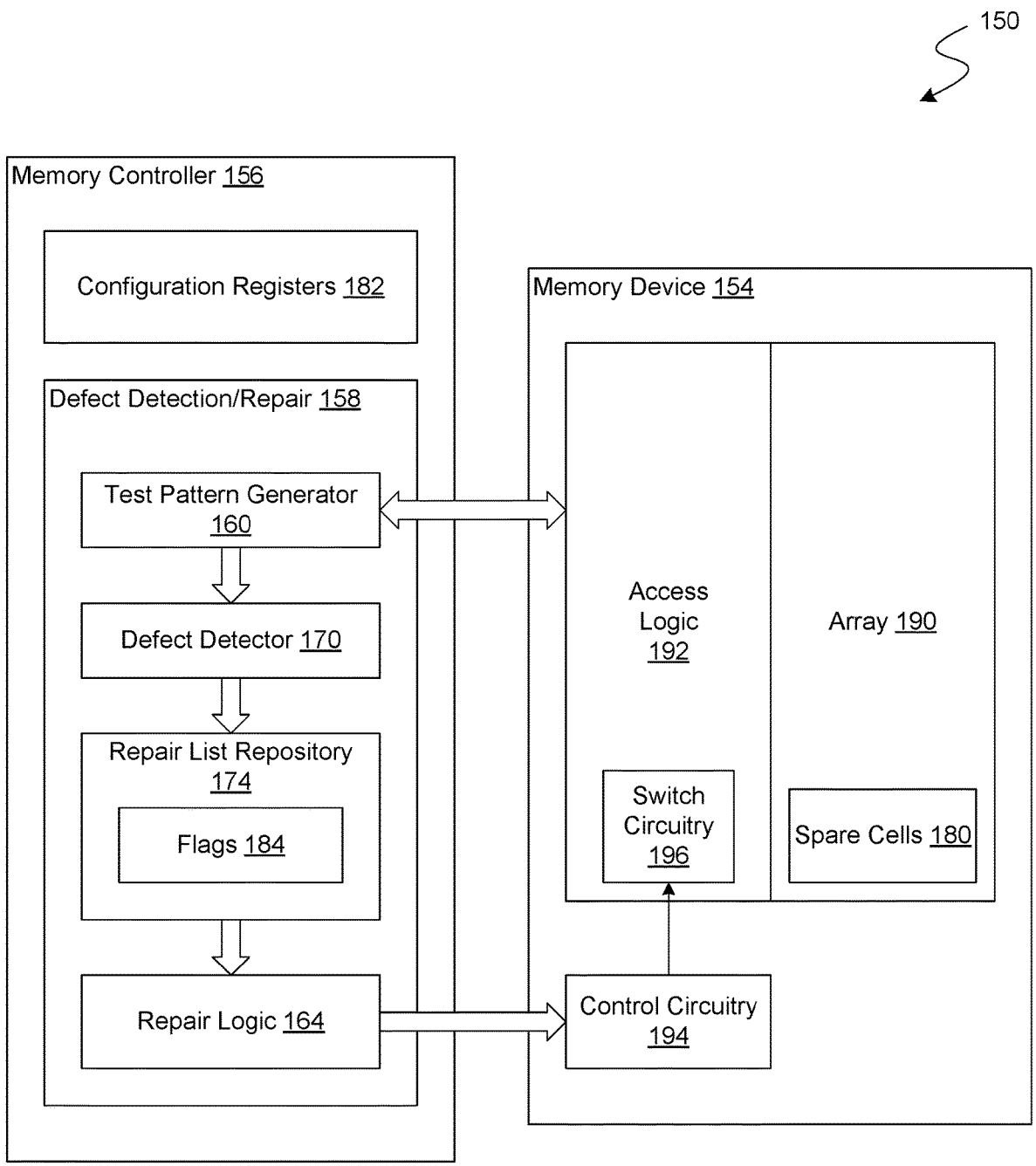

FIG. 1B shows a more detailed example of a system 150 to provide memory repair functionality according to an embodiment. System 150 comprises a memory controller 156 and a memory device 154 which is coupled thereto—e.g., wherein memory controller 156 and memory device 154 correspond functionally to memory controller 106 and memory device 104 (respectively). Memory controller 156 comprises a defect detection and repair circuit 158 that, for example, provides some or all of the functionality of defect detection and repair circuit 108.

Defect detection and repair circuit 158 includes a test pattern generator 160 for generating test patterns, writing test data to the memory device, sending a copy of the data to a defect detector circuit 170, and sending a series of read commands to read back the test data. The read data from the memory device 154 is routed to defect detector circuit 170, where the expected data from test pattern generator 160 is compared to the actual data from memory device 154 to detect defective memory cells in memory device 154.

Defect detector circuit 170 stores in a memory, configured as a repair list repository 174 also disposed within defect detection and repair circuit 158, a list of memory locations of memory device 154, where some or all such memory locations each identify a respective one or more defective memory cells in memory device 154. In some embodiments, the repair list repository 174 comprises registers or other memory locations for various flags 184. For example, a flag is set indicating that the number of memory locations having at least one defective memory cell exceeds the maximum for a particular memory region of memory device 104. Another flag is set for each memory region, indicating whether at least one row of the particular memory region has at least one defective memory cell within the particular memory region. Other flags 184 are stored in repair list repository 174, depending upon the particular application.

A repair logic circuit 164 of defect detection and repair circuit 158 includes logic circuitry adapted to read the list of memory locations stored in repair list repository 174, and to communicate to memory device 154 one or more signals each identifying a respective memory cell that has been determined to be defective.

Memory device 154 comprises an array 190 of memory cells that are arranged in rows and columns—e.g., wherein array 190 comprises any of various volatile or non-volatile memory cells. In an embodiment, array 190 comprises spare cells 180 which are variously made available each to be used as a substitute for a respective defective memory cell of array 190. Memory device 154 further comprises circuitry (represented as access logic 192) to facilitate, at least in part, access to cells of array 190—e.g., where such access if provided for servicing one or more commands from memory controller 156. Access logic 192 includes, or operates in conjunction with, row decoder circuitry, column decoder circuitry and/or other circuit logic of memory device 154 which (for example) provides memory resource access according to conventional techniques—e.g., where such conventional techniques are supplemented with memory repair functionality as described herein. By way of illustration and not limitation, access logic 192 includes or couples to switch circuitry 196 which is operable to switchedly couple various signal lines each to (and/or switchedly decouple various signal lines each from) a respective memory cell of array 190. Such coupling and/or decoupling with switch circuitry 196 is responsive to control circuitry 194 of memory device 154—e.g., based on control circuitry 194 receiving from repair logic circuit 164 a signal which identifies a particular defective memory cell of array 190.

Figure 2:
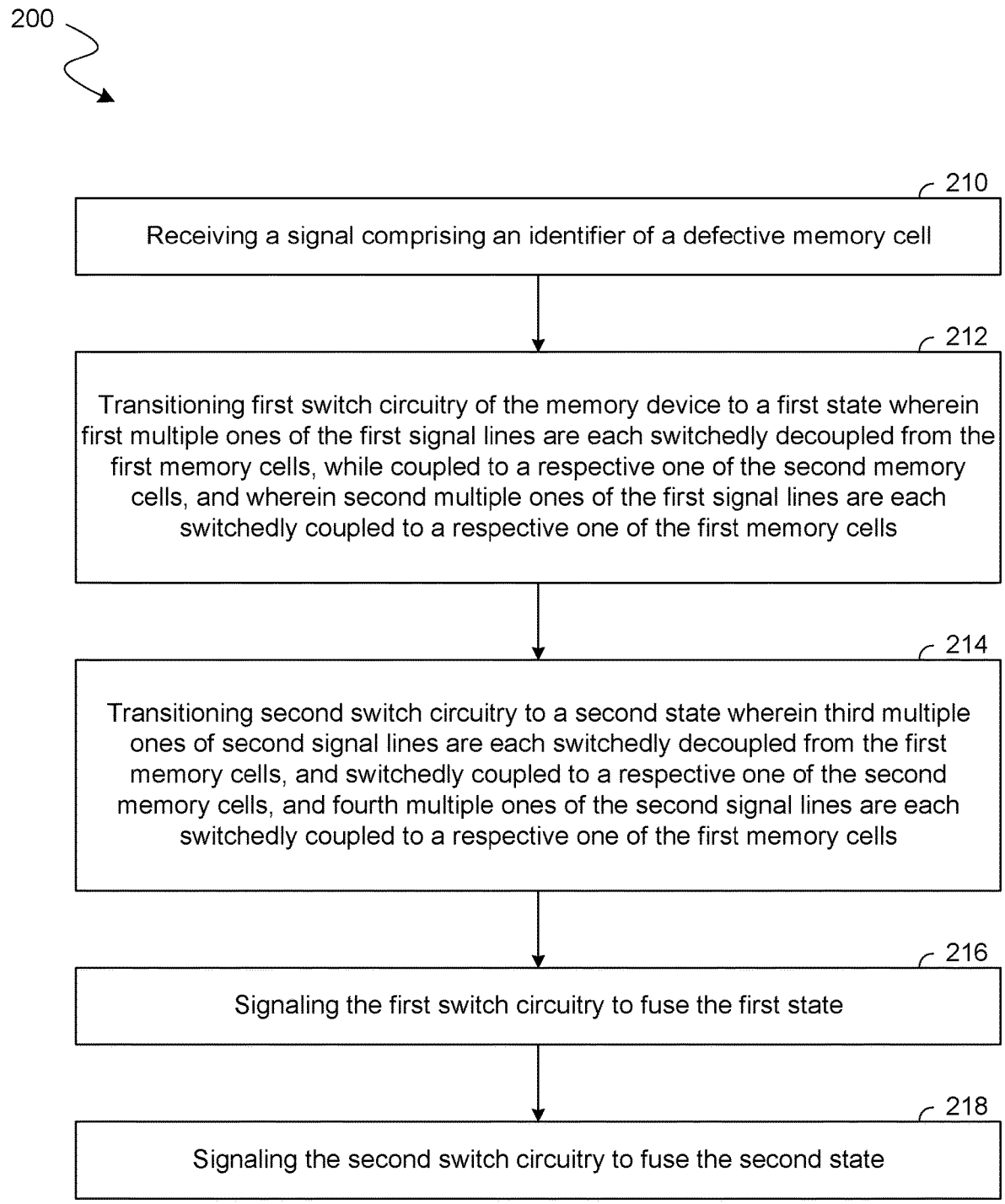
FIG. 2 illustrates a flow diagram showing features of a method to operate a memory device according to an embodiment.

FIG. 2 shows features of a method 200 to operate a memory device according to an embodiment. Method 200 is one example of an embodiment wherein switch circuitry of a memory device variously couples multiple signal lines each to a different respective memory cell, and/or variously decouples multiple signal lines each from a different respective memory cell, where each such coupling and/or decoupling is based on the identification of a defective memory cell. In various embodiments, method 200 is performed with circuitry such as that of computer architecture device 100 or system 150.

As shown in FIG. 2, method 200 comprises (at 210) receiving—e.g., at control circuitry of the memory device—a signal which comprises an identifier of a defective memory cell. A memory array of the memory device comprises a column which comprises first memory cells and second memory cells, wherein the first memory cells comprise the defective memory cell. The second memory cells are available as spare cells to be used as an alternative for defective ones of the first memory cells. In an embodiment, first switch circuitry of the memory device is coupled to communicate first data signals between first signal lines and the column. Additionally or alternatively, second switch circuitry of the memory device is coupled to communicate second data signals between second signal lines and the column—e.g., wherein the first signal lines communicate data to be written to the column, and the second signal lines communicate data which has been read from the column.

Method 200 further comprises (at 212) transitioning the first switch circuitry to a first state wherein first multiple ones of the first signal lines are each switchedly decoupled from the first memory cells based on the identifier, while coupled to a respective one of the second memory cells. The first state further switchedly couples second multiple ones of the first signal lines each to a respective one of the first memory cells (where each such switched coupling is based on the identifier).

Method 200 further comprises (at 214) transitioning the second switch circuitry to a second state wherein third multiple ones of the second signal lines are each switchedly decoupled from the first memory cells, based on the identifier, and switchedly coupled to a respective one of the second memory cells. The second state further switchedly couples fourth multiple ones of the second signal lines each to a respective one of the first memory cells based on the identifier. In one such embodiment, the first state prevents multiple ones of the first memory cells—the multiple ones including the defective cell, and at least one other cell which is adjacent to the defective cell—from participation in data writes. Furthermore, the second state prevents the same multiple ones of the first memory cells from participation in data reads.

Although some embodiments are not limited in this regard, method 200 further comprises (at 216) providing signaling—e.g., from the control circuitry—to fuse the first state of the first switch circuitry (by activation of one or more fuse circuits of the first switch circuitry). Additionally or alternatively, method 200 further comprises (at 218) providing the same or other signaling to fuse the second state of the second switch circuitry. Such fusing prevents a subsequent change to one or more switched modes (e.g., including one or more multiplexer modes) of the first switch circuitry and/or the second switch circuitry.

Figure 3:
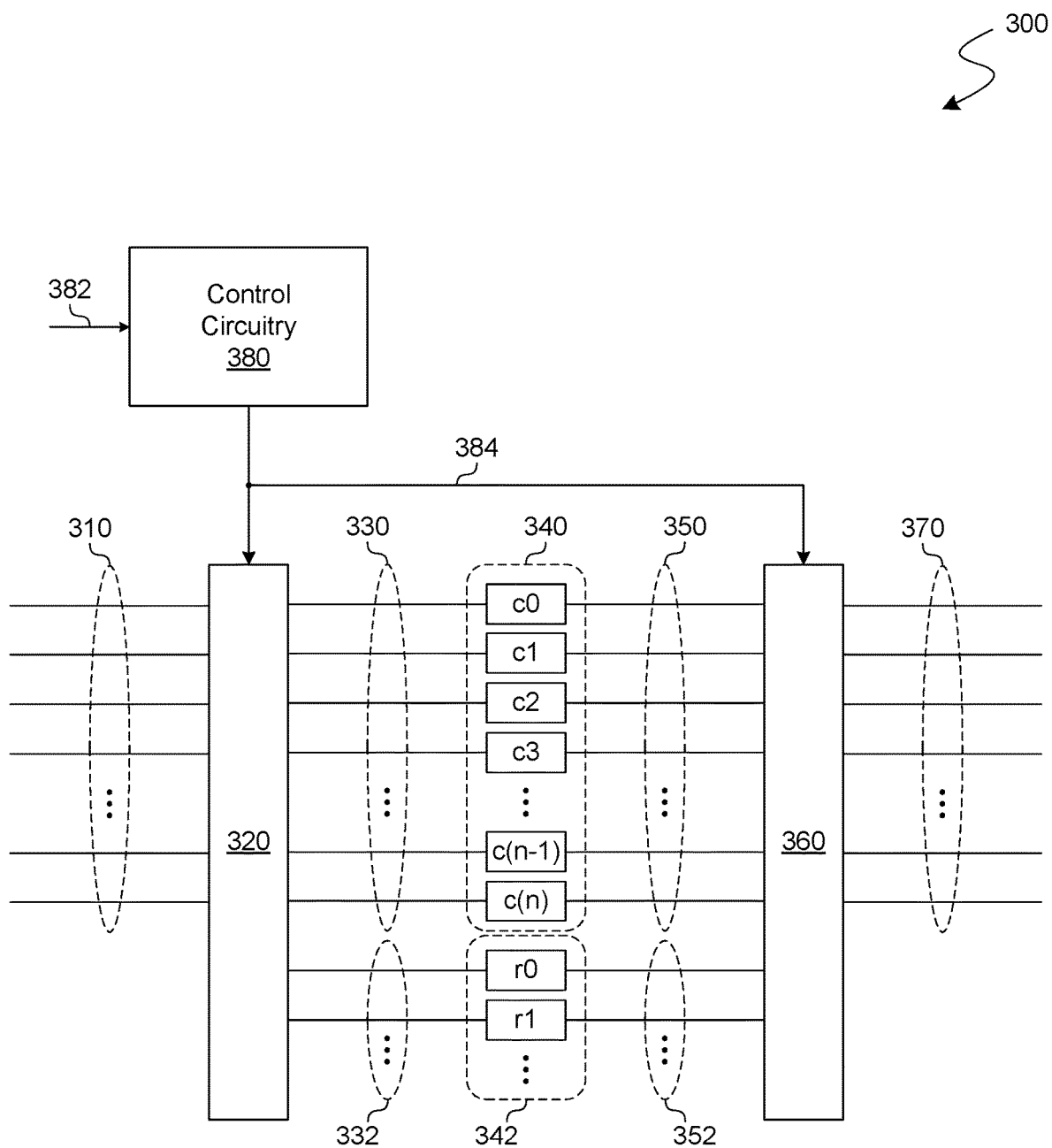
FIG. 3 illustrates a functional block diagram showing features of a memory device which supports memory repair operations according to an embodiment.

FIG. 3 shows features of a device 300 to provide memory repair functionality according to an embodiment. Device 300 is one example of an embodiment which is operable to switchedly couple various data signal lines each to a respective memory cell, and to switchedly decouple various other data signal lines each from a respective memory cell, where the various couplings and the various decouplings are each based on an indication that a particular memory cell is defective. In various embodiments, device 300 includes features of one of memory devices 104, 154—e.g., where functionality of device 300 is provided according to method 200.

As shown in FIG. 3, device 300 comprises signal lines 310, memory cells 340, and switch circuitry 320 which is coupled between memory cells 340 and signal lines 310—e.g., wherein signal lines 330 each couple a different respective one of memory cells 340 to switch circuitry 320. Device 300 further comprises memory cells 342 which (along with memory cells 340) are in the same column of a memory array. A total number of memory cells 342 is equal to (or greater than) two. Additional circuitry of device 300—e.g., the additional circuitry including signal lines 332—facilitates communication between memory cells 342 and various ones of signal lines 310. In some embodiment, signal lines 332 each extend from a different respective one of signal lines 310—e.g., where switch circuitry 320 simply shorts signal lines 310 each to a different respective one of signal lines 310 (or, in an alternative embodiment, where signal lines 332 bypass switch circuitry 320 to couple each to a different respective one of signal lines 310). In other embodiments, one or more switches, multiplexers and/or other components of switch circuitry 320 are variously coupled between signal lines 332 and respective ones of signal lines 310.

In some embodiments, device 300 additionally or alternatively comprises signal lines 370 and switch circuitry 360 which is coupled between memory cells 340 and signal lines 370—e.g., wherein signal lines 350 each couple a different respective one of memory cells 340 to switch circuitry 360. In one such embodiment, additional signal lines 352 each couple a respective one of memory cells 342 to switch circuitry 360. In one example embodiment such as that of computer architecture 150, array 190 comprises memory cells 340 and spare cells 180 comprises memory cells 342—e.g., wherein control circuitry 194 corresponds functionally to control circuitry 380, and switch circuitry 196 corresponds functionally to switch circuitry 320 and/or to switch circuitry 360.

Signal lines 310 are variously coupled each to receive a different respective one of multiple data signals which represent bits of data to be written to the column. By contrast, signal lines 370 are variously coupled each to output a different respective one of multiple data signals which represent bits of data that are read from the column. In various embodiments, memory cells 340 are cell-contiguous with each other in one column of the memory array—e.g., wherein memory cells 342 are cell-contiguous with each other in the same column (and, for example, where memory cells 340 and memory cells 342 comprise respective cells which are contiguous with each other in the column). In one such embodiment, memory cells 342 are at an end (top or bottom) of the column.

To facilitate memory repair functionality, device 300 further comprises control circuitry 380 which is coupled to control switch circuitry 320 and/or switch circuitry 360. For example, control circuitry 380 is coupled to receive a signal 382 comprising an identifier of a defective memory cell of memory cells 340 (e.g., where the identifier comprises a cell-specific address value). Based on the identifier communicated via signal 382, control circuitry 380 provides one or more control signals (e.g., including the illustrative control signal 384 shown) to operate switch circuitry 320 and/or switch circuitry 360. For example, control circuitry 380 comprises any of a variety of suitable circuit resources which facilitate multi-cell switching (e.g., multi-cell multiplexing) based on such an identifier. In some embodiments, such switching is performed independent of any signal which specifies or otherwise indicates that some additional memory cell of the same column (for example, another memory cell which adjoins the defective memory cell) might also be defective.

By way of illustration and not limitation, control circuitry 380 is operable to variously correspond each of memory cells 340 with a different respective combination of multiple ones of memory cells 340 and memory cells 342 (e.g., the combinations each including all of memory cells 342, and each further including a different respective subset of memory cells 340). In one such embodiment, control circuitry 380 is able to select any one the various combinations to store data communicated by signal lines 310, where such selecting is based on an indication that the corresponding memory cell is defective. Such a selected combination of multiple ones of memory cells 340 and memory cells 342 omits two or more of memory cells 340.

In an illustrative scenario according to one embodiment, signal 382 identifies a defective one of memory cells 340, where—based on such identification—control circuitry 380 operates switch circuitry 320 and/or switch circuitry 360 to select a corresponding combination of multiple ones of memory cells 340 and memory cells 342. The selected combination omits two or more of memory cells 340—e.g., wherein the two or more memory cells are contiguous with each other in the column, and comprise the defective memory cell.

For example, in various embodiments, switch circuitry 320 comprises first multiplexer circuits which are each coupled to a different respective two of signal lines 310 and to a different respective memory cell of memory cells 340 and memory cells 342. Additionally or alternatively, switch circuitry 360 comprises second multiplexer circuits which are each coupled to a different respective one of signal lines 370 and to a different respective two memory cells of memory cells 340 and memory cells 342. In one such embodiment, control circuitry 380 generates control signals which are each to operate a different respective one of the first multiplexer circuits and/or to control a different respective one of the second multiplexer circuits. For example, multiple circuits of control circuitry 380 each generate a different respective one of such control signals—e.g., wherein the multiple circuits are coupled to each other in a daisy chain configuration.

As variously illustrated herein, control circuitry 380 transitions switch circuitry 320 to a respective switch state which corresponds to the defective memory cell identified by signal 382. During said state of switch circuitry 320, for each signal line of some first multiple ones of signal lines 310, the signal line is switchedly decoupled (based on the identifier of the defective memory cell) from memory cells 340, wherein—after said switched decoupling—the signal line is electrically coupled to a respective one of memory cells 342. Furthermore, during said state of switch circuitry 320, for each signal line of some second multiple ones of signal lines 310, the signal line is switchedly coupled to a respective one of memory cells 340 based on the identifier of the defective memory cell. Additionally or alternatively, control circuitry 380 transitions switch circuitry 360 to a respective switch state which also corresponds to the defective memory cell identified by signal 382. During said state of switch circuitry 360, for each signal line of some third multiple ones of signal lines 370, the signal line is switchedly decoupled (based on the identifier of the defective memory cell) from memory cells 340, and switchedly coupled to a respective one of memory cells 342. Furthermore, during said state of switch circuitry 360, for each signal line of some fourth multiple ones of signal lines 370, the signal line is switchedly coupled to a respective one of memory cells 340 based on the identifier of the defective memory cell.

Figure 4:
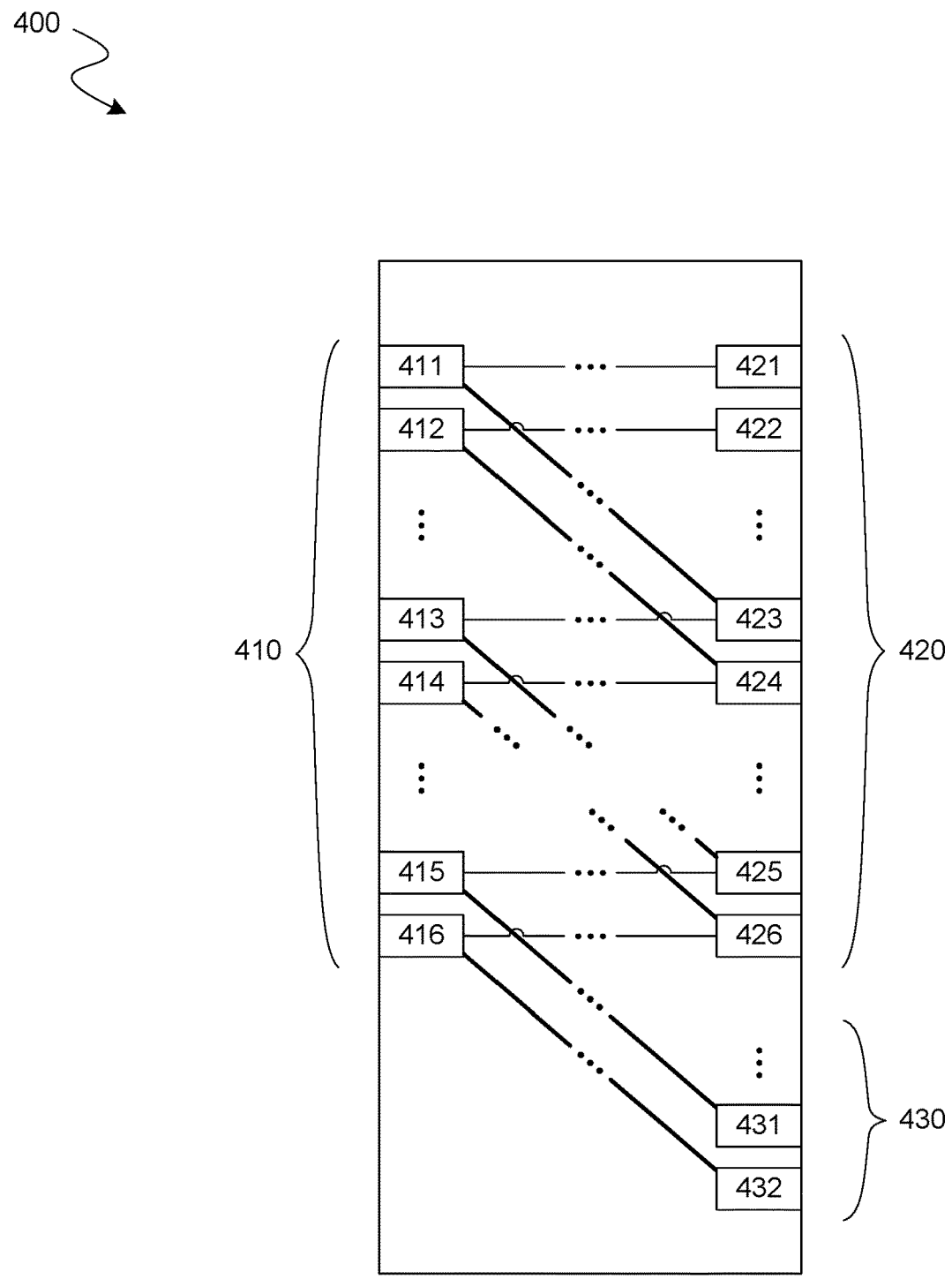
FIG. 4 illustrates a functional block diagram showing features of switch circuitry to facilitate memory repair operations according to an embodiment.

FIG. 4 illustrates features of switch circuitry 400 to facilitate memory repair functionality according to an embodiment. More particularly, FIG. 4 shows a logical representation of how switch circuitry 400 is operable to variously provide switched couplings each between a different respective two terminals by which switch circuitry 400 is to be coupled to other circuitry of a memory device. In various embodiments, switch circuitry 400 includes features of switch circuitry 320 or switch circuitry 360—e.g., wherein an operational state of switch circuitry 400 is provided according to method 200.

As shown in FIG. 4, switch circuitry 400 comprises terminals 410 by which switch circuitry 400 is to be coupled to a column of a memory array, or (alternatively) to multiple data signal lines. Switch circuitry 400 further comprises terminals 420 by which switch circuitry 400 is to be coupled to the other of the column or the data signal lines. In some embodiments, switch circuitry 400 further comprises terminals 430 by which switch circuitry 400 is to be coupled to spare memory cells of the column. However, in other embodiments, switch circuitry 400 omits such terminals 430.

In one example embodiment, terminals 410 couple switch circuitry 400 to signal lines 310, wherein terminal 420 couple switch circuitry 400 to memory cells 340. In another example embodiment, terminals 410 couple switch circuitry 400 to signal lines 370—e.g., wherein terminal 420 couple switch circuitry 400 to memory cells 340 and terminals 430 couple switch circuitry 400 to memory cells 342.

In the illustrative embodiment shown, switch circuitry 400 is operable to multiplex, or otherwise switchedly couple, either of terminals 421, 423 to terminal 411 (where terminal 411 is thereby switchedly decoupled from the other of terminals 421, 423). Furthermore, switch circuitry 400 supports switched coupling of terminal 412 to either one of terminals 422, 424. Further still, switch circuitry 400 supports switched coupling of terminal 415 to either one of terminals 425, 431, and switched coupling of terminal 416 to either one of terminals 426, 432. In some embodiments, switch circuitry 400 further supports switched coupling of terminal 413 to either one of terminal 423 or another terminal (such as terminal 425). Alternatively or in addition, switch circuitry 400 further supports switched coupling of terminal 414 to either one of terminal 424 or another terminal (such as terminal 426).

In some embodiments, the various switched couplings of different pairs of terminals with each other (and/or the various switched decouplings of different pairs of terminals from each other) are based on the same identification of a faulty memory cell. For example, a condition which is determinative whether a particular one of terminals 410 is to be coupled to a particular one of terminals 420 (or, in some embodiments, to a particular one of terminals 430) is also determinative of whether, some or all others of terminals 410 are to be coupled each to a respective one of terminals 420 (or, in some embodiments, to a respective one of terminals 430).

Figure 5A:
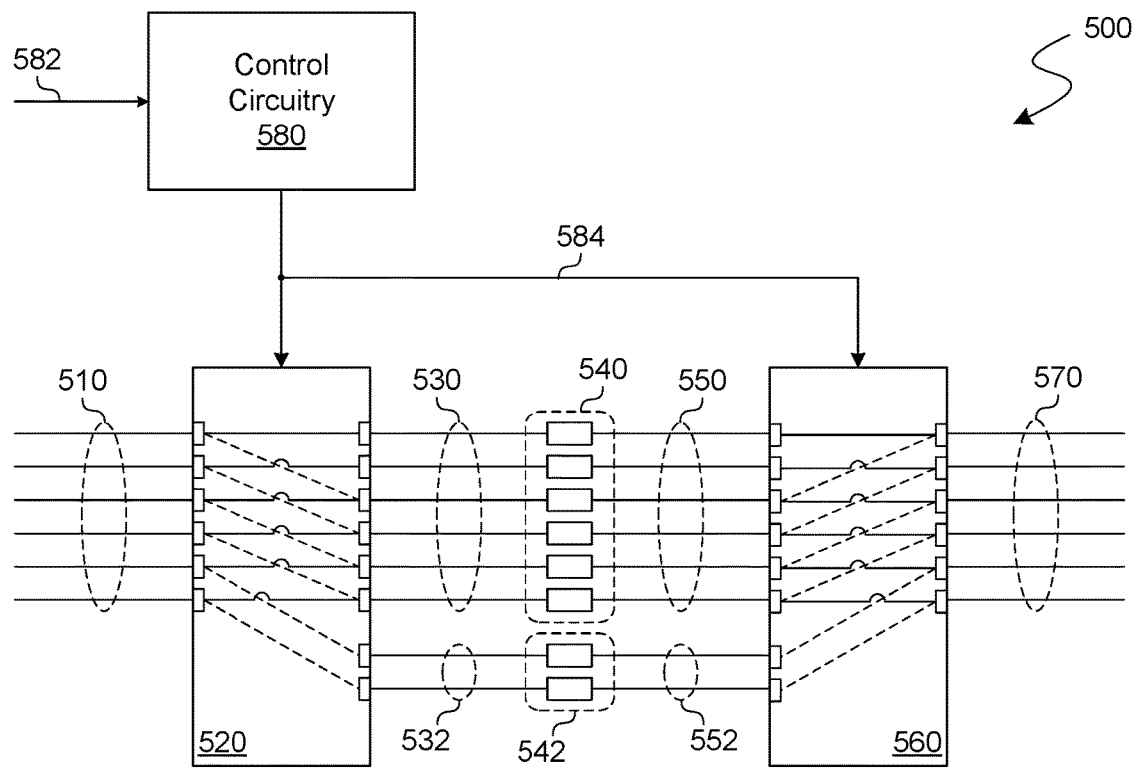
FIG. 5A illustrates a functional block diagram showing features of a memory device which supports memory repair operations according to an embodiment.

FIG. 5A shows features of a device 500 to provide memory repair functionality according to an embodiment. Device 500 is one example of an embodiment wherein two spare memory cells available to be used in case two defective memory cells are adjacent to each other in a column of a memory array. In various embodiments, device 500 includes features of memory device 104, memory device 154, or device 300—e.g., where functionality of device 500 is provided according to method 200.

As shown in FIG. 5A, device 500 comprises signal lines 510, signal lines 530, signal lines 532, signal lines 550, signal lines 552, signal lines 570, switch circuitry 520, switch circuitry 560, a memory array (a column of which comprises the illustrative memory cells 540, and memory cells 542 shown), and control circuitry 580. In one such embodiment, signal lines 510, signal lines 530, signal lines 532, signal lines 550, signal lines 552, and signal lines 570 correspond functionally to signal lines 310, signal lines 330, signal lines 332, signal lines 350, signal lines 352, and signal lines 370 (respectively). Furthermore, switch circuitry 520 and switch circuitry 560 correspond functionally to switch circuitry 320 and switch circuitry 360 (respectively). Further still, memory cells 540 and memory cells 542 correspond functionally to memory cells 340 and memory cells 342 (respectively)—e.g., wherein control circuitry 580 corresponds functionally to control circuitry 380. In some embodiments, switch circuitry 520 and/or switch circuitry 560 provides functionality of switch circuitry 400.

In an illustrative scenario according to one embodiment, control circuitry 580 receives a signal 582 which identifies a defective one of memory cells 540. Based on such identification, control circuitry 580 operates switch circuitry 520 and/or switch circuitry 560 (e.g., with one or more control signals 584) to select a corresponding combination of multiple ones of memory cells 540 and memory cells 542 that are to participate in data writes and/or data reads. The selected combination omits two of memory cells 540—e.g., the two including the defective memory cell and another memory cell adjacent thereto—that are to be excluded from data reads and/or data writes.

For example, control circuitry 580 transitions switch circuitry 520 to a first state which corresponds to the defective memory cell identified by signal 582. During the first state, for each signal line of some first multiple ones of signal lines 510, the signal line is switchedly decoupled (based on the identifier of the defective memory cell) from memory cells 540, wherein—after said switched decoupling—the signal line is electrically coupled to a respective one of memory cells 542. Furthermore, during said first state of switch circuitry 520, for each signal line of some second multiple ones of signal lines 510, the signal line is switchedly coupled to a respective one of memory cells 540 based on the identifier of the defective memory cell. Additionally or alternatively, control circuitry 580 transitions switch circuitry 560 to a second state which also corresponds to the defective memory cell identified by signal 582. During the second state, for each signal line of some third multiple ones of signal lines 570, the signal line is switchedly decoupled (based on the identifier of the defective memory cell) from memory cells 540, and switchedly coupled to a respective one of memory cells 542. Furthermore, during the second state of switch circuitry 560, for each signal line of some fourth multiple ones of signal lines 570, the signal line is switchedly coupled to a respective one of memory cells 540 based on the identifier of the defective memory cell.

In various embodiments, switch circuitry 520 comprises first multiplexer circuits which are each coupled to a different respective two memory cells of the column, wherein switch circuitry 560 comprises which are second multiplexer circuits each coupled to a different respective two memory cells of the column. Based on the identifier of the defective memory cell, control circuitry 580 generates control signals each to control a different respective one of the first multiplexer circuits, and/or each to control a different respective one of the second multiplexer circuits. In one such embodiment, control circuitry 580 comprises multiple control circuits which are arranged in a daisy chain configuration, where the multiple control circuits each generate a different respective one of said control signals. Accordingly, whether a particular one of signal lines 510 is to be coupled to the respective first (higher) memory cell or the respective second (lower) memory cell is determinative of whether, for each signal line of one or more others of signal lines 510, the signal line is to be coupled to the respective first (higher) memory cell or the respective second (lower) memory cell. Alternatively or in addition, whether a particular one of signal lines 570 is to be coupled to the respective first (higher) memory cell or the respective second (lower) memory cell is determinative of whether, for each signal line of one or more others of signal lines 570, the signal line is to be coupled to the respective first (higher) memory cell or the respective second (lower) memory cell.

Figure 5B:
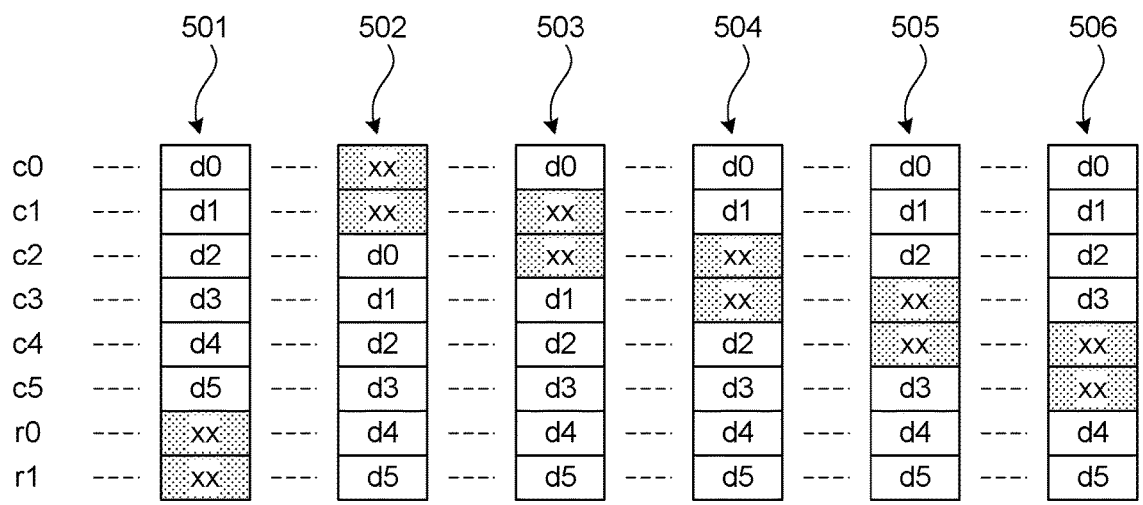
FIG. 5B illustrates functional block diagrams showing respective memory repair scenarios each according to a corresponding embodiment.

FIG. 5B illustrates various examples 501-506 of switch states to be provided by switch circuitry to facilitate a memory repair according to an embodiment. Switch states such as those illustrated by examples 501-506 are provided, for example, by any of the various switch circuitry 196, 320, 360, 400, 520, 560 described herein—e.g., where a given one of such switch states is determined according to method 200.

Examples 501-506 each show a different respective correspondence of data bits d0-d5 each to a respective memory cell in a column of a memory array. More particularly, the column comprises memory cells c0-c5, as well as spare memory cells r0, r1 which are available to be used as alternatives to faulty ones of memory cells c0-c5. In various embodiments, data bits d0-d5 are each of the same bit significance—e.g., where bytes (or words, etc.) stored in different rows of the memory array each comprise a respective one of data bits d0-d5.

The first switch state of example 501 is configured in the absence of any of memory cells c0-c5 being identified as defective. In example 501, memory cells c0-c5 are coupled by the first switch state to store data bits d0-d5 (respectively), while the spare memory cells r0, r1 are decoupled by the first switch state to prevent their participation in reads and/or writes.

The second switch state of example 502 is configured based on an identification of one of memory cells c0, c1 as being defective. In example 502, memory cells c2-c5, r0, and r1 are coupled by the second switch state to store data bits d0-d5 (respectively), while memory cells c0, c1 are decoupled by the second switch state to prevent their participation in reads and/or writes.

The third switch state of example 503 is configured based on an identification of one of memory cells c1, c2 as being defective. In example 503, memory cells c0, c3-c5, r0, and r1 are coupled by the third switch state to store data bits d0-d5 (respectively), while memory cells c1, c2 are decoupled by the third switch state to prevent their participation in reads and/or writes.

The fourth switch state of example 504 is configured based on an identification of one of memory cells c2, c3 as being defective. In example 504, memory cells c0-c1, c4-c5, r0, and r1 are coupled by the fourth switch state to store data bits d0-d5 (respectively), while memory cells c2, c3 are decoupled by the fourth switch state to prevent their participation in reads and/or writes.

The fifth switch state of example 505 is configured based on an identification of one of memory cells c3, c4 as being defective. In example 505, memory cells c0-c2, c5, r0, and r1 are coupled by the fifth switch state to store data bits d0-d5 (respectively), while memory cells c3, c4 are decoupled by the fifth switch state to prevent their participation in reads and/or writes.

The sixth switch state of example 506 is configured based on an identification of one of memory cells c4, c5 as being defective. In example 506, memory cells c0-c3, r0, and r1 are coupled by the sixth switch state to store data bits d0-d5 (respectively), while memory cells c4, c5 are decoupled by the sixth switch state to prevent their participation in reads and/or writes.

Figure 6A:
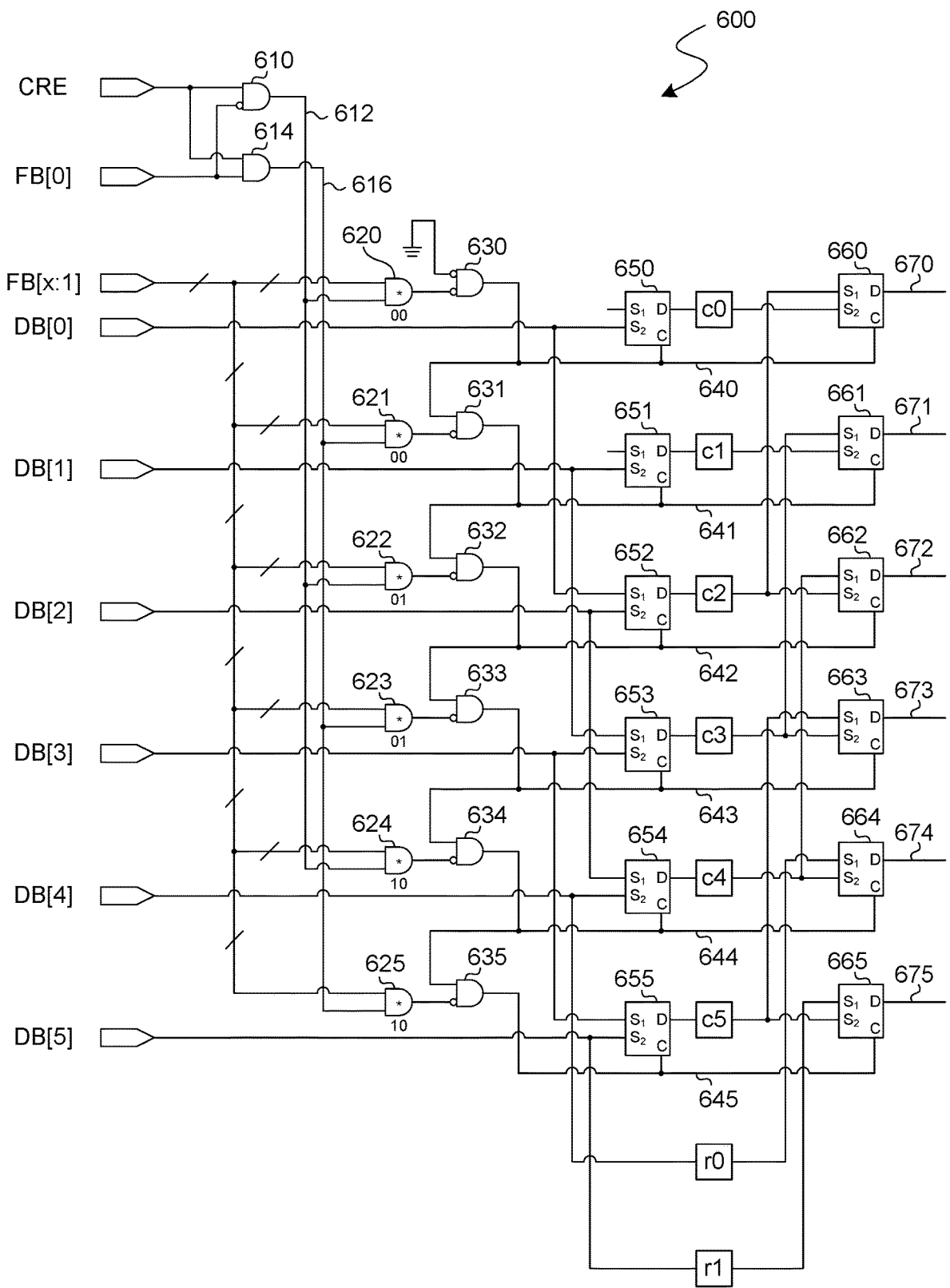
FIG. 6A, 6B illustrate circuit diagrams each showing features of a memory device which supports memory repair operations according to an embodiment.

FIG. 6A shows features of a memory device 600 to correct for defective cells of a memory array according to an embodiment. In various embodiments, device 600 includes features of memory device 104, memory device 154, device 300, or device 500—e.g., where functionality of device 600 is provided according to method 200.

As shown in FIG. 6A, device 600 comprises a memory array, one column of which includes memory cells c0-c5 and spare memory cells r0, r1. The respective numbers of memory cells c0-c5 and spare memory cells r0, r1 are merely illustrative, and not limiting on other embodiments. Signal lines DB[0]-DB[5] of device 600 are coupled to receive different respective data signals which each represent a corresponding bit to be stored to the column, where other signal lines 670-675 of device 600 are coupled to receive different respective data signals which each represent a corresponding bit being read from the column.

In one such embodiment, signal lines DB[0]-DB[5] correspond functionally to signal lines 510, and signal lines 570 correspond functionally to signal line 670—e.g., where memory cells c0-c5 and spare memory cells r0-r1 correspond functionally to memory cells 540 and memory cells 542 (respectively). Alternatively or in addition, functionality of control circuitry 580 is provided with logic gates 610, 614, 620-625, and 630-635 of device 600—e.g., where functionality of switch circuitry 520 is provided with multiplexers 650-655, and where functionality of switch circuitry 560 is provided with multiplexers 660-665.

For example, device 600 is operable to configure a switch state of multiplexers 650-655 and/or multiplexers 660-665, where said switch state corresponds to a particular memory cell that has been identified as being defective. In one example embodiment, device 600 receives or otherwise determines an (x+1) bit value FB[x:0] (where x is a positive integer) which represents a bit address or other suitable identifier of a defective one of cells c0-c5. Configuring the switch state based on FB[x:0] is enabled, for example, by a column redundancy enable control signal (CRE) which is variously provided to logic gates 610, 614 along with a least significant bit FB[0] of the value FB[x:0].

Based on the signals FB[0] and CRE, logic gates 610, 614 generate respective signals 612, 616 which variously indicate whether the defective cell is an odd one of cells c0-c5, or an even one of cells c0-c5. Logic gates 620-625 each receive a respective one of signals 612, 616 as well as a subset of the (x+1) bit value FB[x:0]—in this example, the x bits FB[x:1]. As described in more detail herein, different ones of FB[x:1] are variously inverted at the respective input sides of logic gates 620-625 to facilitate a cascading of mode configurations at multiplexers 650-655 and/or at multiplexers 660-665. The various type of bit inverting are indicated in FIG. 6A by asterisks ("*") and by the notations "00," "01," and "10," which represent that—at least with respect to the two least significant bits of FB[x:1]—both bits are inverted ("00"), only the more significant bit is inverted ("01"), or only the least significant bit is inverted ("10").

Based on the different input inversions variously provide by logic gates 620-625, one and only one of logic gates 620-625 will output a logic high signal indicating a match with the defective memory cell, as identified by FB[x:0]. Logic gates 630-635 are coupled to receive the respective outputs of logic gates 620-625, and are further coupled to one another in a daisy chain configuration, wherein the respective control signals 640-644 generated by logic gates 630-634 are provided to logic gates 631-635 (respectively). Control signals 640-645 are further provided to multiplexers 650-655 (respectively) and—in some embodiments—to multiplexers 660-665 (respectively).

For each of multiplexers 650-655, 660-665, the multiplexer comprises a respective output terminal D, and respective input terminals S1, S2, where a corresponding one of control signals 640-645 determines whether the input terminal D is to be switchedly coupled to a particular one and only one of input terminals S1, S2.

Accordingly, whether a particular one of multiplexers 650-655 is to provide a particular type of switched coupling is determinative of whether one or more others multiplexer 650-655 (further down the column, for example) are each to provide a corresponding type of switched coupling. Alternatively or in addition, whether a particular one of multiplexers 660-665 is to provide a particular type of switched coupling is determinative of whether one or more others multiplexer 660-665 (further down the column, for example) are each to provide a corresponding type of switched coupling.

Figure 6B:
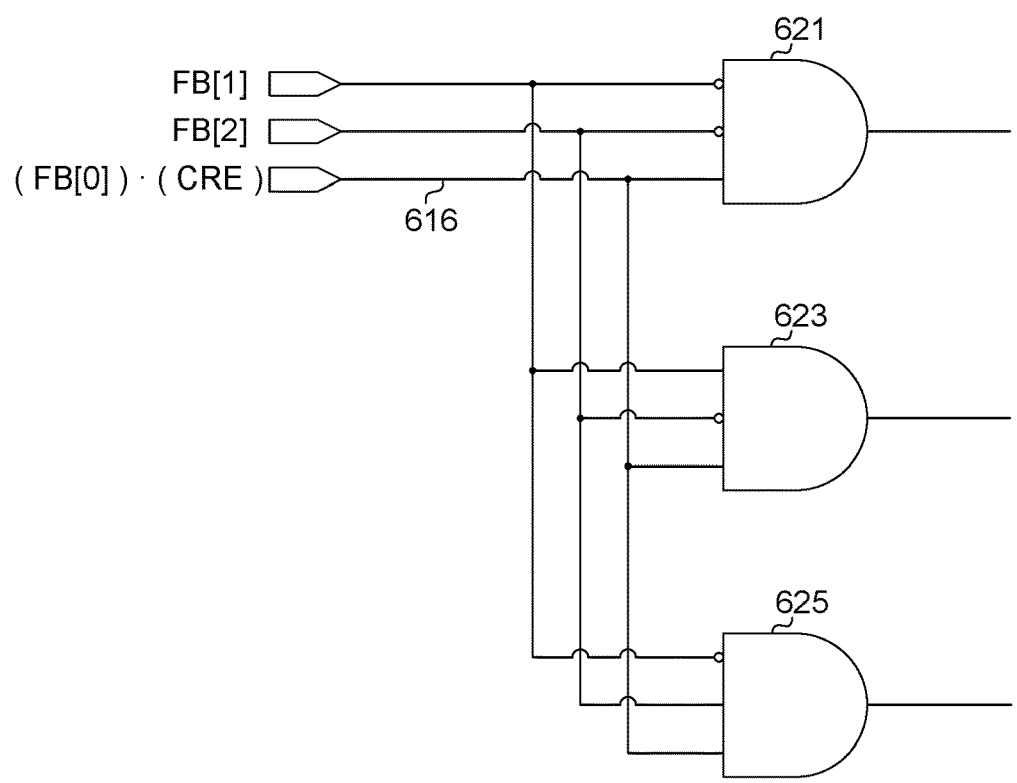

FIG. 6B shows a detail view 601 of circuit logic provided by memory device 600 according to some embodiments wherein (for example) FB[x:0] is a three bit value to identify a location, along the column, of a faulty one of the six memory cells c0-c5. As shown in FIG. 6B, logic gate 621 inverts both of the second and third least significant bits—FB[1] and FB[2], respectively—of FB[x:0]. By contrast, logic gate 623 inverts bit FB[2], but not bit FB[1]—e.g., wherein logic gate 625 inverts bit FB[1], but not bit FB[2]. The selective inverting of input signals by gates 621, 623, 625 facilitates a cascade of signals communicated in the daisy chain configuration of gates 630-635.

Figure 7:
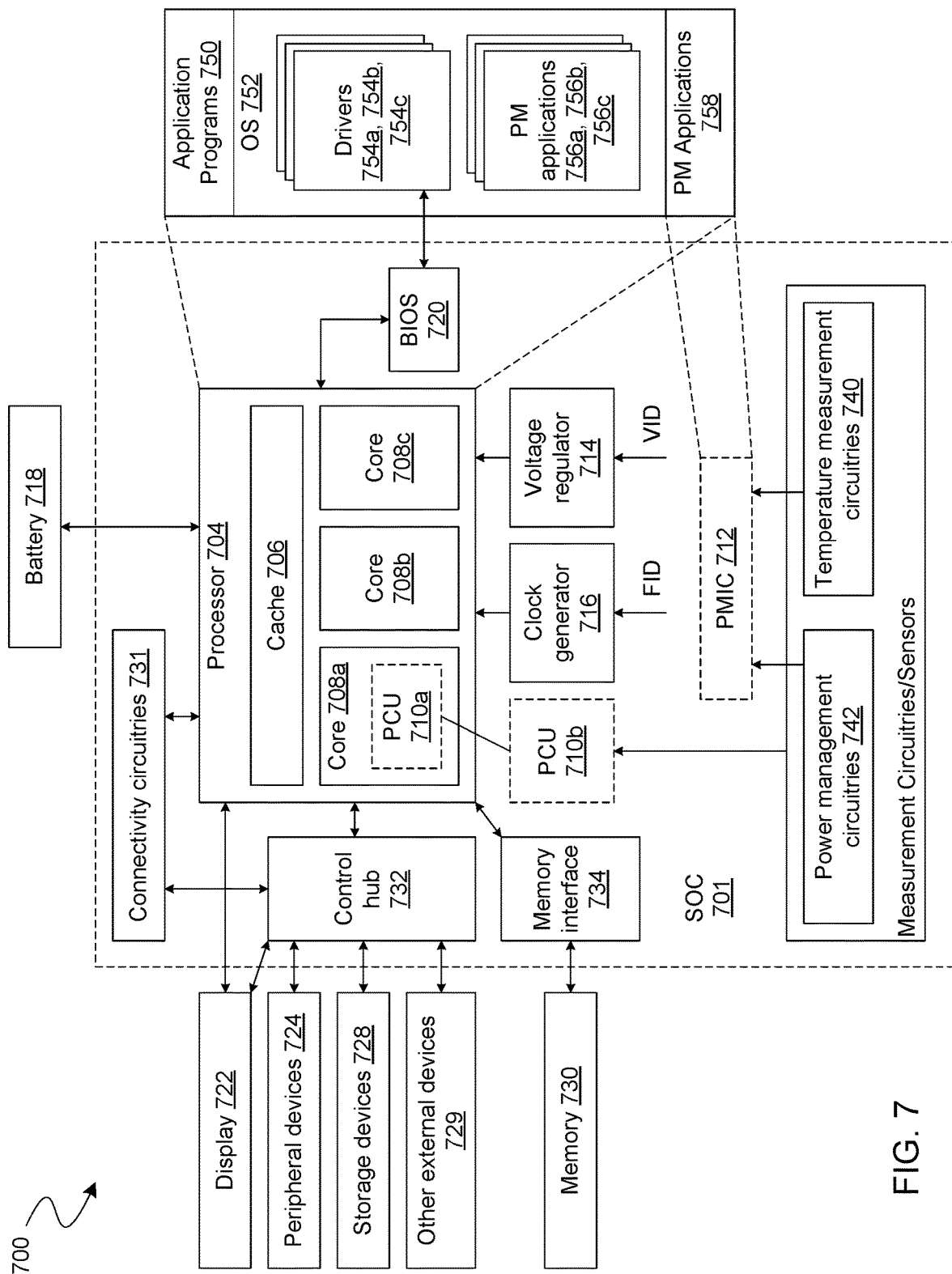
FIG. 7 is a functional block diagram illustrating a computing device built in accordance with an embodiment.

FIG. 7 illustrates a computer system or computing device 700 (also referred to as device 700), where memory repair functionality is provided in accordance with some embodiments. It is pointed out that those elements of FIG. 7 having the same reference numbers (or names) as the elements of any other figure can operate or function in any manner similar to that described, but are not limited to such.

In some embodiments, device 700 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 700.

In an example, the device 700 comprises a SoC (System-on-Chip) 701. An example boundary of the SOC 701 is illustrated using dotted lines in FIG. 7, with some example components being illustrated to be included within SOC 701—however, SOC 701 may include any appropriate components of device 700.

In some embodiments, device 700 includes processor 704. Processor 2110 can include one or more physical devices, such as microprocessors, application processors, microcontrollers, programmable logic devices, processing cores, or other processing means. The processing operations performed by processor 704 include the execution of an operating platform or operating system on which applications and/or device functions are executed. The processing operations include operations related to I/O (input/output) with a human user or with other devices, operations related to power management, operations related to connecting computing device 700 to another device, and/or the like. The processing operations may also include operations related to audio I/O and/or display I/O.

In some embodiments, processor 704 includes multiple processing cores (also referred to as cores) 708a, 708b, 708c. Although merely three cores 708a, 708b, 708c are illustrated in FIG. 7, the processor 704 may include any other appropriate number of processing cores, e.g., tens, or even hundreds of processing cores. Processor cores 708a, 708b, 708c may be implemented on a single integrated circuit (IC) chip. Moreover, the chip may include one or more shared and/or private caches, buses or interconnections, graphics and/or memory controllers, or other components.

In some embodiments, processor 704 includes cache 706. In an example, sections of cache 706 may be dedicated to individual cores 708 (e.g., a first section of cache 706 dedicated to core 708a, a second section of cache 706 dedicated to core 708b, and so on). In an example, one or more sections of cache 706 may be shared among two or more of cores 708. Cache 706 may be split in different levels, e.g., level 1 (L1) cache, level 2 (L2) cache, level 3 (L3) cache, etc.

In some embodiments, processor core 704 may include a fetch unit to fetch instructions (including instructions with conditional branches) for execution by the core 704. The instructions may be fetched from any storage devices such as the memory 730. Processor core 704 may also include a decode unit to decode the fetched instruction. For example, the decode unit may decode the fetched instruction into a plurality of micro-operations. Processor core 704 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 704 may be an out-of-order processor core in one embodiment. Processor core 704 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 704 may also include a bus unit to enable communication between components of the processor core 704 and other components via one or more buses. Processor core 704 may also include one or more registers to store data accessed by various components of the core 704 (such as values related to assigned app priorities and/or sub-system states (modes) association.

In some embodiments, device 700 comprises connectivity circuitries 731. For example, connectivity circuitries 731 includes hardware devices (e.g., wireless and/or wired connectors and communication hardware) and/or software components (e.g., drivers, protocol stacks), e.g., to enable device 700 to communicate with external devices. Device 700 may be separate from the external devices, such as other computing devices, wireless access points or base stations, etc.

In an example, connectivity circuitries 731 may include multiple different types of connectivity. To generalize, the connectivity circuitries 731 may include cellular connectivity circuitries, wireless connectivity circuitries, etc. Cellular connectivity circuitries of connectivity circuitries 731 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 731 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 731 may include a network interface, such as a wired or wireless interface, e.g., so that a system embodiment may be incorporated into a wireless device, for example, cell phone or personal digital assistant.

In some embodiments, device 700 comprises control hub 732, which represents hardware devices and/or software components related to interaction with one or more I/O devices. For example, processor 704 may communicate with one or more of display 722, one or more peripheral devices 724, storage devices 728, one or more other external devices 729, etc., via control hub 732. Control hub 732 may be a chipset, a Platform Control Hub (PCH), and/or the like.

For example, control hub 732 illustrates one or more connection points for additional devices that connect to device 700, e.g., through which a user might interact with the system. For example, devices (e.g., devices 729) that can be attached to device 700 include microphone devices, speaker or stereo systems, audio devices, video systems or other display devices, keyboard or keypad devices, or other I/O devices for use with specific applications such as card readers or other devices.

As mentioned above, control hub 732 can interact with audio devices, display 722, etc. For example, input through a microphone or other audio device can provide input or commands for one or more applications or functions of device 700. Additionally, audio output can be provided instead of, or in addition to display output. In another example, if display 722 includes a touch screen, display 722 also acts as an input device, which can be at least partially managed by control hub 732. There can also be additional buttons or switches on computing device 700 to provide I/O functions managed by control hub 732. In one embodiment, control hub 732 manages devices such as accelerometers, cameras, light sensors or other environmental sensors, or other hardware that can be included in device 700. The input can be part of direct user interaction, as well as providing environmental input to the system to influence its operations (such as filtering for noise, adjusting displays for brightness detection, applying a flash for a camera, or other features).

In some embodiments, control hub 732 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 722 represents hardware (e.g., display devices) and software (e.g., drivers) components that provide a visual and/or tactile display for a user to interact with device 700. Display 722 may include a display interface, a display screen, and/or hardware device used to provide a display to a user. In some embodiments, display 722 includes a touch screen (or touch pad) device that provides both output and input to a user. In an example, display 722 may communicate directly with the processor 704. Display 722 can be one or more of an internal display device, as in a mobile electronic device or a laptop device or an external display device attached via a display interface (e.g., DisplayPort, etc.). In one embodiment display 722 can be a head mounted display (HMD) such as a stereoscopic display device for use in virtual reality (VR) applications or augmented reality (AR) applications.

In some embodiments and although not illustrated in the figure, in addition to (or instead of) processor 704, device 700 may include Graphics Processing Unit (GPU) comprising one or more graphics processing cores, which may control one or more aspects of displaying contents on display 722.

Control hub 732 (or platform controller hub) may include hardware interfaces and connectors, as well as software components (e.g., drivers, protocol stacks) to make peripheral connections, e.g., to peripheral devices 724.

It will be understood that device 700 could both be a peripheral device to other computing devices, as well as have peripheral devices connected to it. Device 700 may have a "docking" connector to connect to other computing devices for purposes such as managing (e.g., downloading and/or uploading, changing, synchronizing) content on device 700. Additionally, a docking connector can allow device 700 to connect to certain peripherals that allow computing device 700 to control content output, for example, to audiovisual or other systems.

In addition to a proprietary docking connector or other proprietary connection hardware, device 700 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 731 may be coupled to control hub 732, e.g., in addition to, or instead of, being coupled directly to the processor 704. In some embodiments, display 722 may be coupled to control hub 732, e.g., in addition to, or instead of, being coupled directly to processor 704.

In some embodiments, device 700 comprises memory 730 coupled to processor 704 via memory interface 734. Memory 730 includes memory devices for storing information in device 700. Memory can include nonvolatile (state does not change if power to the memory device is interrupted) and/or volatile (state is indeterminate if power to the memory device is interrupted) memory devices. Memory device 730 can be a dynamic random access memory (DRAM) device, a static random access memory (SRAM) device, flash memory device, phase-change memory device, or some other memory device having suitable performance to serve as process memory. In one embodiment, memory 730 can operate as system memory for device 700, to store data and instructions for use when the one or more processors 704 executes an application or process. Memory 730 can store application data, user data, music, photos, documents, or other data, as well as system data (whether long-term or temporary) related to the execution of the applications and functions of device 700. In some embodiments, memory 730 supports memory repair functionality variously described herein—e.g., wherein memory 730 corresponds functionally to one of devices 104, 154, 300, 500, 600.

Elements of various embodiments and examples are also provided as a machine-readable medium (e.g., memory 730) for storing the computer-executable instructions (e.g., instructions to implement any other processes discussed herein). The machine-readable medium (e.g., memory 730) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 700 comprises temperature measurement circuitries 740, e.g., for measuring temperature of various components of device 700. In an example, temperature measurement circuitries 740 may be embedded, or coupled or attached to various components, whose temperature are to be measured and monitored. For example, temperature measurement circuitries 740 may measure temperature of (or within) one or more of cores 708a, 708b, 708c, voltage regulator 714, memory 730, a mother-board of SOC 701, and/or any appropriate component of device 700.

In some embodiments, device 700 comprises power measurement circuitries 742, e.g., for measuring power consumed by one or more components of the device 700. In an example, in addition to, or instead of, measuring power, the power measurement circuitries 742 may measure voltage and/or current. In an example, the power measurement circuitries 742 may be embedded, or coupled or attached to various components, whose power, voltage, and/or current consumption are to be measured and monitored. For example, power measurement circuitries 742 may measure power, current and/or voltage supplied by one or more voltage regulators 714, power supplied to SOC 701, power supplied to device 700, power consumed by processor 704 (or any other component) of device 700, etc.

In some embodiments, device 700 comprises one or more voltage regulator circuitries, generally referred to as voltage regulator (VR) 714. VR 714 generates signals at appropriate voltage levels, which may be supplied to operate any appropriate components of the device 700. Merely as an example, VR 714 is illustrated to be supplying signals to processor 704 of device 700. In some embodiments, VR 714 receives one or more Voltage Identification (VID) signals, and generates the voltage signal at an appropriate level, based on the VID signals. Various type of VRs may be utilized for the VR 714. For example, VR 714 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 710*a/b* and/or PMIC 712. In some embodiments, each core has a network of distributed LDOs to provide efficient control for power management. The LDOs can be digital, analog, or a combination of digital or analog LDOs.

In some embodiments, device 700 comprises one or more clock generator circuitries, generally referred to as clock generator 716. Clock generator 716 generates clock signals at appropriate frequency levels, which may be supplied to any appropriate components of device 700. Merely as an example, clock generator 716 is illustrated to be supplying clock signals to processor 704 of device 700. In some embodiments, clock generator 716 receives one or more Frequency Identification (FID) signals, and generates the clock signals at an appropriate frequency, based on the FID signals.

In some embodiments, device 700 comprises battery 718 supplying power to various components of device 700. Merely as an example, battery 718 is illustrated to be supplying power to processor 704. Although not illustrated in the figures, device 700 may comprise a charging circuitry, e.g., to recharge the battery, based on Alternating Current (AC) power supply received from an AC adapter.

In some embodiments, device 700 comprises Power Control Unit (PCU) 710 (also referred to as Power Management Unit (PMU), Power Controller, etc.). In an example, some sections of PCU 710 may be implemented by one or more processing cores 708, and these sections of PCU 710 are symbolically illustrated using a dotted box and labelled PCU 710*a*. In an example, some other sections of PCU 710 may be implemented outside the processing cores 708, and these sections of PCU 710 are symbolically illustrated using a dotted box and labelled as PCU 710*b*. PCU 710 may implement various power management operations for device 700. PCU 710 may include hardware interfaces, hardware circuitries, connectors, registers, etc., as well as software components (e.g., drivers, protocol stacks), to implement various power management operations for device 700.

In some embodiments, device 700 comprises Power Management Integrated Circuit (PMIC) 712, e.g., to implement various power management operations for device 700. In some embodiments, PMIC 712 is a Reconfigurable Power Management ICs (RPMICs) and/or an IMVP (Intel® Mobile Voltage Positioning). In an example, the PMIC is within an IC chip separate from processor 704. The may implement various power management operations for device 700. PMIC 712 may include hardware interfaces, hardware circuitries, connectors, registers, etc., as well as software components (e.g., drivers, protocol stacks), to implement various power management operations for device 700.

In an example, device 700 comprises one or both PCU 710 or PMIC 712. In an example, any one of PCU 710 or PMIC 712 may be absent in device 700, and hence, these components are illustrated using dotted lines.

Various power management operations of device 700 may be performed by PCU 710, by PMIC 712, or by a combination of PCU 710 and PMIC 712. For example, PCU 710 and/or PMIC 712 may select a power state (e.g., P-state) for various components of device 700. For example, PCU 710 and/or PMIC 712 may select a power state (e.g., in accordance with the ACPI (Advanced Configuration and Power Interface) specification) for various components of device 700. Merely as an example, PCU 710 and/or PMIC 712 may cause various components of the device 700 to transition to a sleep state, to an active state, to an appropriate C state (e.g., C0 state, or another appropriate C state, in accordance with the ACPI specification), etc. In an example, PCU 710 and/or PMIC 712 may control a voltage output by VR 714 and/or a frequency of a clock signal output by the clock generator, e.g., by outputting the VID signal and/or the FID signal, respectively. In an example, PCU 710 and/or PMIC 712 may control battery power usage, charging of battery 718, and features related to power saving operation.

The clock generator 716 can comprise a phase locked loop (PLL), frequency locked loop (FLL), or any suitable clock source. In some embodiments, each core of processor 704 has its own clock source. As such, each core can operate at a frequency independent of the frequency of operation of the other core. In some embodiments, PCU 710 and/or PMIC 712 performs adaptive or dynamic frequency scaling or adjustment. For example, clock frequency of a processor core can be increased if the core is not operating at its maximum power consumption threshold or limit. In some embodiments, PCU 710 and/or PMIC 712 determines the operating condition of each core of a processor, and opportunistically adjusts frequency and/or power supply voltage of that core without the core clocking source (e.g., PLL of that core) losing lock when the PCU 710 and/or PMIC 712 determines that the core is operating below a target performance level. For example, if a core is drawing current from a power supply rail less than a total current allocated for that core or processor 704, then PCU 710 and/or PMIC 712 can temporarily increase the power draw for that core or processor 704 (e.g., by increasing clock frequency and/or power supply voltage level) so that the core or processor 704 can perform at a higher performance level. As such, voltage and/or frequency can be increased temporality for processor 704 without violating product reliability.

In an example, PCU 710 and/or PMIC 712 may perform power management operations, e.g., based at least in part on receiving measurements from power measurement circuitries 742, temperature measurement circuitries 740, charge level of battery 718, and/or any other appropriate information that may be used for power management. To that end, PMIC 712 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 710 and/or PMIC 712 in at least one embodiment to allow PCU 710 and/or PMIC 712 to manage processor core energy at least in part based on value(s) detected by one or more of the sensors.

Also illustrated is an example software stack of device 700 (although not all elements of the software stack are illustrated). Merely as an example, processors 704 may execute application programs 750, Operating System 752, one or more Power Management (PM) specific application programs (e.g., generically referred to as PM applications 758), and/or the like. PM applications 758 may also be executed by the PCU 710 and/or PMIC 712. OS 752 may also include one or more PM applications 756a, 756b, 756c. The OS 752 may also include various drivers 754a, 754b, 754c, etc., some of which may be specific for power management purposes. In some embodiments, device 700 may further comprise a Basic Input/Output System (BIOS) 720. BIOS 720 may communicate with OS 752 (e.g., via one or more drivers 754), communicate with processors 704, etc.

For example, one or more of PM applications 758, 756, drivers 754, BIOS 720, etc. may be used to implement power management specific tasks, e.g., to control voltage and/or frequency of various components of device 700, to control wake-up state, sleep state, and/or any other appropriate power state of various components of device 700, control battery power usage, charging of the battery 718, features related to power saving operation, etc.

In one or more first embodiments, a memory device comprises an array of memory cells, wherein a column of the array comprises first memory cells and second memory cells, control circuitry to receive a signal comprising an identifier of a defective memory cell of the first memory cells, and switch circuitry coupled to communicate data signals between signal lines and the column, wherein, responsive to the control circuitry, the switch circuitry is to transition to a state wherein, for each signal line of first multiple ones of the signal lines, the signal line is switchedly decoupled from the first memory cells, based on the identifier, and the signal line is coupled to a respective one of the second memory cells, and, for each signal line of second multiple ones of the signal lines, the signal line is switchedly coupled to a respective one of the first memory cells based on the identifier.

In one or more second embodiments, further to the first embodiment, the switch circuitry comprises multiplexer circuits each coupled to a different respective two memory cells of the column, and wherein, based on the identifier, the control circuitry is to generate control signals each to operate a different respective one of the multiplexer circuits.

In one or more third embodiments, further to the second embodiment, the control circuitry comprises multiple control circuits coupled to each other in a daisy chain configuration, the multiple control circuits each to generate a different respective one of the control signals.

In one or more fourth embodiments, further to any of the first through third embodiments, a total number of the second memory cells is equal to two.

In one or more fifth embodiments, further to any of the first through fourth embodiments, the switch circuitry comprises first switch circuitry, the signal lines comprise first signal lines, and the data signals comprise first data signals, the memory device further comprises second switch circuitry coupled to communicate second data signals between second signal lines and the column, wherein, responsive to the control circuitry, the second switch circuitry is to transition to a second state wherein, for each signal line of third multiple ones of the second signal lines, the signal line is switchedly decoupled from the first memory cells, based on the identifier, and the signal line is switchedly coupled to a respective one of the second memory cells, and, for each signal line of fourth multiple ones of the second signal lines, the signal line is switchedly coupled to a respective one of the first memory cells based on the identifier.

In one or more sixth embodiments, further to the fifth embodiment, the first switch circuitry comprises first multiplexer circuits each coupled to a different respective two memory cells of the column, wherein the second switch circuitry comprises second multiplexer circuits each coupled to a different respective two memory cells of the column, and wherein, based on the identifier, the control circuitry is to generate control signals each to control a different respective one of the first multiplexer circuits, and further to control a different respective one of the second multiplexer circuits.

In one or more seventh embodiments, further to the sixth embodiment, the control circuitry comprises multiple control circuits coupled to each other in a daisy chain configuration, the multiple control circuits each to generate a different respective one of the control signals.

In one or more eighth embodiments, further to any of the first through seventh embodiments, the control circuitry is further to fuse the state of the switch circuitry.

In one or more ninth embodiments, a memory device comprises an array of memory cells, wherein a column of the array comprises first memory cells and second memory cells, switch circuitry coupled to communicate data signals between signal lines and the column, and control circuitry to receive a signal comprising an identifier of a defective memory cell of the first memory cells, the control circuitry further to transition the switch circuitry to a state which is based on the identifier of the defective memory cell, and which is independent of whether any other memory cell of the column has been identified as defective, wherein the state switchedly decouples, from respective ones of the signal lines, both the defective memory cell and another memory cell of the first memory cells which adjoins the defective memory cell in the column, and wherein, during the state, two or more of the signal lines are able to communicate each to a different respective one of the second memory cells.

In one or more tenth embodiments, further to the ninth embodiment, the switch circuitry comprises multiplexer circuits each coupled to a different respective two memory cells of the column, and wherein, based on the identifier, the control circuitry is to generate control signals each to operate a different respective one of the multiplexer circuits.

In one or more eleventh embodiments, further to the tenth embodiment, the control circuitry comprises multiple control circuits coupled to each other in a daisy chain configuration, the multiple control circuits each to generate a different respective one of the control signals.

In one or more twelfth embodiments, further to any of the ninth through eleventh embodiments, a total number of the second memory cells is equal to two.

In one or more thirteenth embodiments, further to any of the ninth through twelfth embodiments, the switch circuitry comprises first switch circuitry, the signal lines comprise first signal lines, and the data signals comprise first data signals, wherein the memory device further comprises second switch circuitry coupled to communicate second data signals between second signal lines and the column, wherein the control circuitry is further to transition the second switch circuitry to a second state which is based on the identifier of the defective memory cell, and which is independent of whether any other memory cell of the column has been identified as defective, wherein the second state switchedly decouples, from respective ones of the second signal lines, both the defective memory cell and the other memory cell of the first memory cells, and wherein, during the second state, two or more of the second signal lines are able to communicate each to a different respective one of the second memory cells.

In one or more fourteenth embodiments, further to the thirteenth embodiment, the first switch circuitry comprises first multiplexer circuits each coupled to a different respective two memory cells of the column, wherein the second switch circuitry comprises second multiplexer circuits each coupled to a different respective two memory cells of the column, and wherein, based on the identifier, the control circuitry is to generate control signals each to control a different respective one of the first multiplexer circuits, and further to control a different respective one of the second multiplexer circuits.

In one or more fifteenth embodiments, further to the fourteenth embodiment, the control circuitry comprises multiple control circuits coupled to each other in a daisy chain configuration, the multiple control circuits each to generate a different respective one of the control signals.

In one or more sixteenth embodiments, further to any of the ninth through fifteenth embodiments, the control circuitry is further to fuse the state of the switch circuitry.

In one or more seventeenth embodiments, a system comprises memory device comprising an array of memory cells, wherein a column of the array comprises first memory cells and second memory cells, control circuitry to receive a signal comprising an identifier of a defective memory cell of the first memory cells, and switch circuitry coupled to communicate data signals between signal lines and the column, wherein, responsive to the control circuitry, the switch circuitry is to transition to a state wherein, for each signal line of first multiple ones of the signal lines, the signal line is switchedly decoupled from the first memory cells, based on the identifier, and the signal line is coupled to a respective one of the second memory cells, and, for each signal line of second multiple ones of the signal lines, the signal line is switchedly coupled to a respective one of the first memory cells based on the identifier. The system further comprises a display device couple to the memory device, the display device to display an image based on a communication of the data signals.

In one or more eighteenth embodiments, further to the seventeenth embodiment, the switch circuitry comprises multiplexer circuits each coupled to a different respective two memory cells of the column, and wherein, based on the identifier, the control circuitry is to generate control signals each to operate a different respective one of the multiplexer circuits.

In one or more nineteenth embodiments, further to the eighteenth embodiment, the control circuitry comprises multiple control circuits coupled to each other in a daisy chain configuration, the multiple control circuits each to generate a different respective one of the control signals.

In one or more twentieth embodiments, further to any of the seventeenth through nineteenth embodiments, a total number of the second memory cells is equal to two.

In one or more twenty-first embodiments, further to any of the seventeenth through twentieth embodiments, the switch circuitry comprises first switch circuitry, the signal lines comprise first signal lines, and the data signals comprise first data signals, the memory device further comprises second switch circuitry coupled to communicate second data signals between second signal lines and the column, wherein, responsive to the control circuitry, the second switch circuitry is to transition to a second state wherein, for each signal line of third multiple ones of the second signal lines, the signal line is switchedly decoupled from the first memory cells, based on the identifier, and the signal line is switchedly coupled to a respective one of the second memory cells, and, for each signal line of fourth multiple ones of the second signal lines, the signal line is switchedly coupled to a respective one of the first memory cells based on the identifier.

In one or more twenty-second embodiments, further to the twenty-first embodiment, the first switch circuitry comprises first multiplexer circuits each coupled to a different respective two memory cells of the column, wherein the second switch circuitry comprises second multiplexer circuits each coupled to a different respective two memory cells of the column, and wherein, based on the identifier, the control circuitry is to generate control signals each to control a different respective one of the first multiplexer circuits, and further to control a different respective one of the second multiplexer circuits.

In one or more twenty-third embodiments, further to the twenty-second embodiment, the control circuitry comprises multiple control circuits coupled to each other in a daisy chain configuration, the multiple control circuits each to generate a different respective one of the control signals.

In one or more twenty-fourth embodiments, further to any of the seventeenth through twenty-third embodiments, the control circuitry is further to fuse the state of the switch circuitry.

In one or more twenty-fifth embodiments, a method at a memory device comprises receiving, at control circuitry of the memory device, a signal comprising an identifier of a defective memory cell, wherein a memory array of the memory device comprises a column which comprises the first memory cells and second memory cells, wherein the first memory cells comprise the defective memory cell, and wherein switch circuitry is coupled to communicate data signals between signal lines and the column. The method further comprises, with the control circuitry, transitioning the switch circuitry to a state wherein, for each signal line of first multiple ones of the signal lines, the signal line is switchedly decoupled from the first memory cells, based on the identifier, and the signal line is coupled to a respective one of the second memory cells, and, for each signal line of second multiple ones of the signal lines, the signal line is switchedly coupled to a respective one of the first memory cells based on the identifier.

In one or more twenty-sixth embodiments, further to the twenty-fifth embodiment, the switch circuitry comprises multiplexer circuits each coupled to a different respective two memory cells of the column, and wherein, based on the identifier, the control circuitry generates control signals each to operate a different respective one of the multiplexer circuits.

In one or more twenty-seventh embodiments, further to the twenty-sixth embodiment, the control circuitry comprises multiple control circuits coupled to each other in a daisy chain configuration, wherein the multiple control circuits each generate a different respective one of the control signals.

In one or more twenty-eighth embodiments, further to any of the twenty-fifth through twenty-seventh embodiments, a total number of the second memory cells is equal to two.

In one or more twenty-ninth embodiments, further to any of the twenty-fifth through twenty-eighth embodiments, the switch circuitry comprises first switch circuitry, the signal lines comprise first signal lines, and the data signals comprise first data signals, and wherein second switch circuitry is coupled to communicate second data signals between second signal lines and the column, method further comprises, with the control circuitry, transitioning the second switch circuitry to a second state wherein, for each signal line of third multiple ones of the second signal lines, the signal line is switchedly decoupled from the first memory cells, based on the identifier, and the signal line is switchedly coupled to a respective one of the second memory cells, and, for each signal line of fourth multiple ones of the second signal lines, the signal line is switchedly coupled to a respective one of the first memory cells based on the identifier.

In one or more thirtieth embodiments, further to the twenty-ninth embodiment, the first switch circuitry comprises first multiplexer circuits each coupled to a different respective two memory cells of the column, wherein the second switch circuitry comprises second multiplexer circuits each coupled to a different respective two memory cells of the column, and wherein, based on the identifier, the control circuitry generates control signals each to control a different respective one of the first multiplexer circuits, and further to control a different respective one of the second multiplexer circuits.

In one or more thirty-first embodiments, further to the thirtieth embodiment, the control circuitry comprises multiple control circuits coupled to each other in a daisy chain configuration, wherein the multiple control circuits each generate a different respective one of the control signals.

In one or more thirty-second embodiments, further to any of the twenty-fifth through thirty-first embodiments, the method further comprises fusing the state of the switch circuitry.

In the description herein, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Techniques and architectures for repairing a memory device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A memory device comprising:
   an array of memory cells, wherein a column of the array comprises first memory cells and second memory cells;
   control circuitry to receive a signal comprising an identifier of a defective memory cell of the first memory cells, wherein the control circuitry comprises multiple control circuits, each of the multiple control circuits comprising a respective first AND gate and a respective second AND gate, coupled to each other in a daisy chain configuration, and wherein a second AND gate of one of the multiple control circuits is coupled to a second AND gate of a subsequent one of the multiple control circuits, the multiple control circuits each to generate a different respective one of the control signals;
   switch circuitry coupled to communicate data signals between signal lines and the column, wherein, responsive to the control circuitry, the switch circuitry is to transition to a state wherein:
   for each signal line of first multiple ones of the signal lines, the signal line is switchedly decoupled from the first memory cells, based on the identifier, and the signal line is coupled to a respective one of the second memory cells; and
   for each signal line of second multiple ones of the signal lines, the signal line is switchedly coupled to a respective one of the first memory cells based on the identifier, wherein the switch circuitry comprises 1:2 or 2:1 multiplexer circuits each coupled to a different respective two memory cells of the column, and wherein, based on the identifier, the control circuitry is to generate control signals each to operate a different respective one of the multiplexer circuits.

2. The memory device of claim 1, wherein a total number of the second memory cells is equal to two.

3. The memory device of claim 1, wherein the switch circuitry comprises first switch circuitry, the signal lines comprise first signal lines, and the data signals comprise first data signals, the memory device further comprising:
second switch circuitry coupled to communicate second data signals between second signal lines and the column, wherein, responsive to the control circuitry, the second switch circuitry is to transition to a second state wherein:
for each signal line of third multiple ones of the second signal lines, the signal line is switchedly decoupled from the first memory cells, based on the identifier, and the signal line is switchedly coupled to a respective one of the second memory cells; and
for each signal line of fourth multiple ones of the second signal lines, the signal line is switchedly coupled to a respective one of the first memory cells based on the identifier.

4. The memory device of claim 3, wherein the first switch circuitry comprises first multiplexer circuits each coupled to a different respective two memory cells of the column, wherein the second switch circuitry comprises second multiplexer circuits each coupled to a different respective two memory cells of the column, and wherein, based on the identifier, the control circuitry is to generate control signals each to control a different respective one of the first multiplexer circuits, and further to control a different respective one of the second multiplexer circuits.

5. The memory device of claim 1, wherein the control circuitry is further to fuse the state of the switch circuitry.

6. A memory device comprising:
an array of memory cells, wherein a column of the array comprises first memory cells and second memory cells;
switch circuitry coupled to communicate data signals between signal lines and the column; and
control circuitry to receive a signal comprising an identifier of a defective memory cell of the first memory cells, the control circuitry further to transition the switch circuitry to a state which is based on the identifier of the defective memory cell, and which is independent of whether any other memory cell of the column has been identified as defective;
wherein the state switchedly decouples, from respective ones of the signal lines, both the defective memory cell and another memory cell of the first memory cells which adjoins the defective memory cell in the column; and
wherein, during the state, two or more of the signal lines are able to communicate each to a different respective one of the second memory cells, wherein the switch circuitry comprises 1:2 or 2:1 multiplexer circuits each coupled to a different respective two memory cells of the column, and wherein, based on the identifier, the control circuitry is to generate control signals, and wherein the control circuitry comprises multiple control circuits, each of the multiple control circuits comprising a respective first AND gate and a respective second AND gate, coupled to each other in a daisy chain configuration, and wherein a second AND gate of one of the multiple control circuits is coupled to a second AND gate of a subsequent one of the multiple control circuits, the multiple control circuits each to generate a different respective one of the control signals.

7. The memory device of claim 6, wherein a total number of the second memory cells is equal to two.

8. The memory device of claim 6, wherein the switch circuitry comprises first switch circuitry, the signal lines comprise first signal lines, and the data signals comprise first data signals;
wherein the memory device further comprises second switch circuitry coupled to communicate second data signals between second signal lines and the column;
wherein the control circuitry is further to transition the second switch circuitry to a second state which is based on the identifier of the defective memory cell, and which is independent of whether any other memory cell of the column has been identified as defective;
wherein the second state switchedly decouples, from respective ones of the second signal lines, both the defective memory cell and the another memory cell of the first memory cells; and
wherein, during the second state, two or more of the second signal lines are able to communicate each to a different respective one of the second memory cells.

9. The memory device of claim 8, wherein the first switch circuitry comprises first multiplexer circuits each coupled to a different respective two memory cells of the column, wherein the second switch circuitry comprises second multiplexer circuits each coupled to a different respective two memory cells of the column, and wherein, based on the identifier, the control circuitry is to generate control signals each to control a different respective one of the first multiplexer circuits, and further to control a different respective one of the second multiplexer circuits.

10. A system comprising:
memory device comprising:
an array of memory cells, wherein a column of the array comprises first memory cells and second memory cells;
control circuitry to receive a signal comprising an identifier of a defective memory cell of the first memory cells;
switch circuitry coupled to communicate data signals between signal lines and the column, wherein, responsive to the control circuitry, the switch circuitry is to transition to a state wherein:
for each signal line of first multiple ones of the signal lines, the signal line is switchedly decoupled from the first memory cells, based on the identifier, and the signal line is coupled to a respective one of the second memory cells; and
for each signal line of second multiple ones of the signal lines, the signal line is switchedly coupled to a respective one of the first memory cells based on the identifier, wherein the switch circuitry comprises 1:2 or 2:1 multiplexer circuits each coupled to a different respective two memory cells of the column, wherein the control circuitry comprises multiple control circuits, each of the multiple control circuits comprising a respective first AND gate and a respective second AND gate, coupled to each other in a daisy chain configuration, and wherein a second AND gate of one of the multiple control circuits is coupled to a second AND gate of a subsequent one of the multiple control circuits, the multiple control circuits each to generate a different respective one of the control signals; and a display device couple to the memory device, the display device to display an image based on a communication of the data signals.

11. The system of claim 10, wherein the switch circuitry comprises first switch circuitry, the signal lines comprise first signal lines, and the data signals comprise first data signals, the memory device further comprising:

second switch circuitry coupled to communicate second data signals between second signal lines and the column, wherein, responsive to the control circuitry, the second switch circuitry is to transition to a second state wherein:

for each signal line of third multiple ones of the second signal lines, the signal line is switchedly decoupled from the first memory cells, based on the identifier, and the signal line is switchedly coupled to a respective one of the second memory cells; and for each signal line of fourth multiple ones of the second signal lines, the signal line is switchedly coupled to a respective one of the first memory cells based on the identifier.

12. The system of claim 11, wherein the first switch circuitry comprises first multiplexer circuits each coupled to a different respective two memory cells of the column, wherein the second switch circuitry comprises second multiplexer circuits each coupled to a different respective two memory cells of the column, and wherein, based on the identifier, the control circuitry is to generate control signals each to control a different respective one of the first multiplexer circuits, and further to control a different respective one of the second multiplexer circuits.

* * * * *